United States Patent
Disberger et al.

(10) Patent No.: US 11,849,661 B2
(45) Date of Patent: Dec. 26, 2023

(54) AUTONOMOUS AGRICULTURAL SYSTEM

(71) Applicant: Great Plains Manufacturing, Inc., Salina, KS (US)

(72) Inventors: David Disberger, Salina, KS (US); Benjamin M Smith, Yorktown, VA (US); Rye DeGarmo, Salina, KS (US); Gregory W. Arnett, Solomon, KS (US); Craig A Reed, Salina, KS (US); Chris Coleman, Salina, KS (US)

(73) Assignee: Great Plains Manufacturing, Inc., Salina, KS (US)

( * ) Notice: Subject to any disclaimer, the term of this patent is extended or adjusted under 35 U.S.C. 154(b) by 123 days.

(21) Appl. No.: 17/001,217

(22) Filed: Aug. 24, 2020

(65) Prior Publication Data

US 2021/0051838 A1 Feb. 25, 2021

Related U.S. Application Data

(60) Provisional application No. 62/890,345, filed on Aug. 22, 2019.

(51) Int. Cl.
*A01B 69/00* (2006.01)
*A01B 69/04* (2006.01)
*G05D 1/02* (2020.01)

(52) U.S. Cl.
CPC ......... *A01B 69/008* (2013.01); *G05D 1/0278* (2013.01); *G05D 2201/0201* (2013.01)

(58) Field of Classification Search
CPC .................................................. A01B 69/008
See application file for complete search history.

(56) References Cited

U.S. PATENT DOCUMENTS

| | | | |
|---|---|---|---|
| 4,944,354 A | * | 7/1990 | Langen .................. A01B 71/06 |
| | | | 172/47 |
| 6,321,851 B1 | | 11/2001 | Weiss et al. |
| 9,795,077 B2 | | 10/2017 | Hahn et al. |
| 10,080,321 B2 | | 9/2018 | Blackwell et al. |
| 10,104,824 B2 | | 10/2018 | Blackwell et al. |
| 10,111,373 B2 | * | 10/2018 | Blackwell ............ G05D 1/0246 |

(Continued)

FOREIGN PATENT DOCUMENTS

| | | | | |
|---|---|---|---|---|
| CN | 107875550 A | * | 4/2018 | ............. A62C 27/00 |
| JP | 06023404 A | * | 2/1994 | |

(Continued)

OTHER PUBLICATIONS

PCT Search Report and Written Opinion dated Nov. 25, 2020 for related PCT Patent Application No. PCT/US2020/047652, 12 pages.

(Continued)

*Primary Examiner* — Shelley Chen
(74) *Attorney, Agent, or Firm* — Hovey Williams LLP; Kameron D. Kelly

(57) ABSTRACT

An autonomous agricultural system comprising a mobile power unit including a frame and a power supply. A position of the power supply is shiftable with respect to the frame of the mobile power unit. The autonomous agricultural system additionally includes an implement releasably secured to the mobile power unit. The mobile power unit is configured to transport the implement. The mobile power unit is further configured to provide power from the power supply to the implement.

21 Claims, 15 Drawing Sheets

(56) References Cited

U.S. PATENT DOCUMENTS

| | | | |
|---|---|---|---|
| 10,130,022 B2 | 11/2018 | Blackwell et al. | |
| 10,149,422 B2 * | 12/2018 | Tippery | A01B 35/32 |
| 10,512,209 B2 | 12/2019 | Hahn et al. | |
| 10,575,453 B2 | 3/2020 | Blackwell et al. | |
| 10,589,856 B2 * | 3/2020 | Hohenthal | B64C 39/024 |
| 10,750,652 B2 | 8/2020 | Beaujot | |
| 2002/0125018 A1 | 9/2002 | Bernhardt et al. | |
| 2015/0105962 A1 | 4/2015 | Blackwell | |
| 2015/0105965 A1 | 4/2015 | Blackwell et al. | |
| 2017/0112043 A1 | 4/2017 | Nair et al. | |
| 2017/0251589 A1 * | 9/2017 | Tippery | A01B 51/02 |
| 2020/0120858 A1 | 4/2020 | Hahn et al. | |
| 2020/0170169 A1 | 6/2020 | Blackwell et al. | |

FOREIGN PATENT DOCUMENTS

| | | | | |
|---|---|---|---|---|
| JP | 06-023404 U | | 3/1994 | |
| JP | 4198457 B2 | * | 12/2008 | |
| JP | 2013226161 A | | 11/2013 | |
| KR | 102001517 B1 | * | 12/2018 | |
| KR | 10-2001517 B1 | | 7/2019 | |
| WO | 2017106874 A1 | | 6/2017 | |
| WO | WO-2017106874 A1 | * | 6/2017 | A01B 3/50 |

OTHER PUBLICATIONS https://www.youtube.com/watch?v=9vrGMhGfZUQ, Jun. 1, 2020, 3 pages.

OMNiPOWER by Raven, One Machine. No Driver Required, https://ravenprecision.com/driverless-ag/omnipower, 4 pages.

European Exteneded Search Report dated Nov. 21, 2022, for related European Patent Application No. 20855389.1, 8 pages.

European Extended Search Report dated Oct. 23, 2023 for related European Patent Application No. 21741653.6, 11 pages.

* cited by examiner

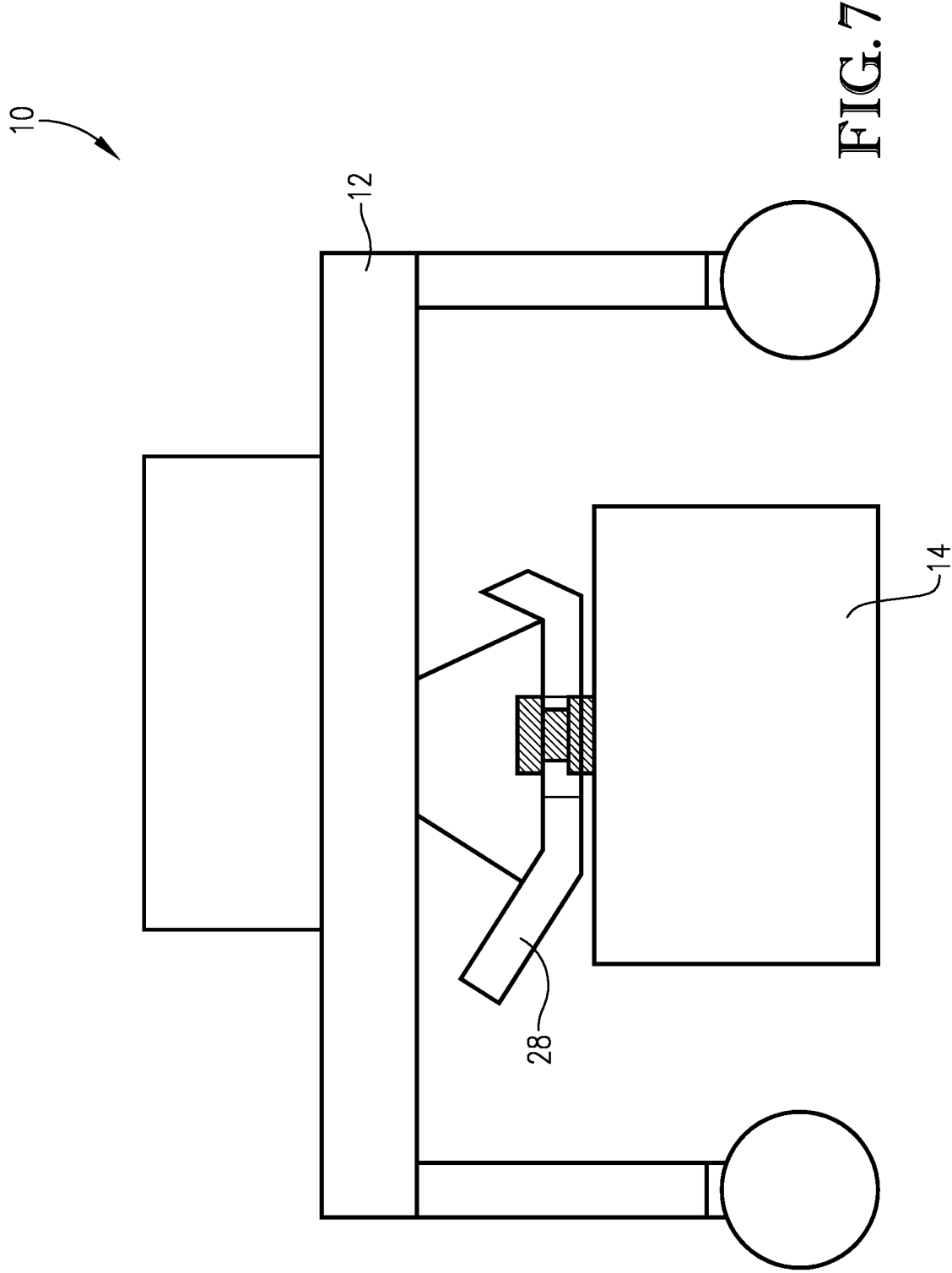

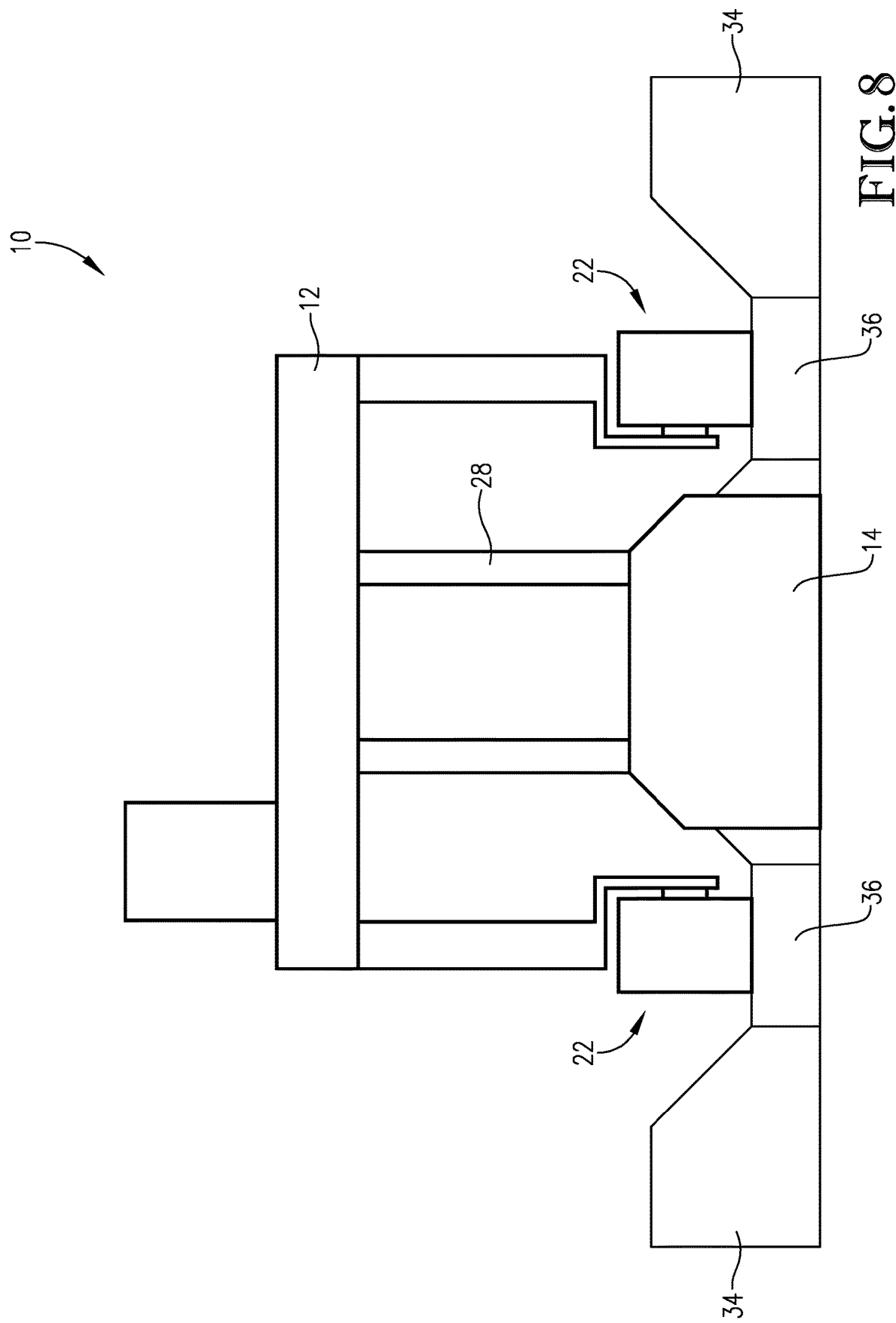

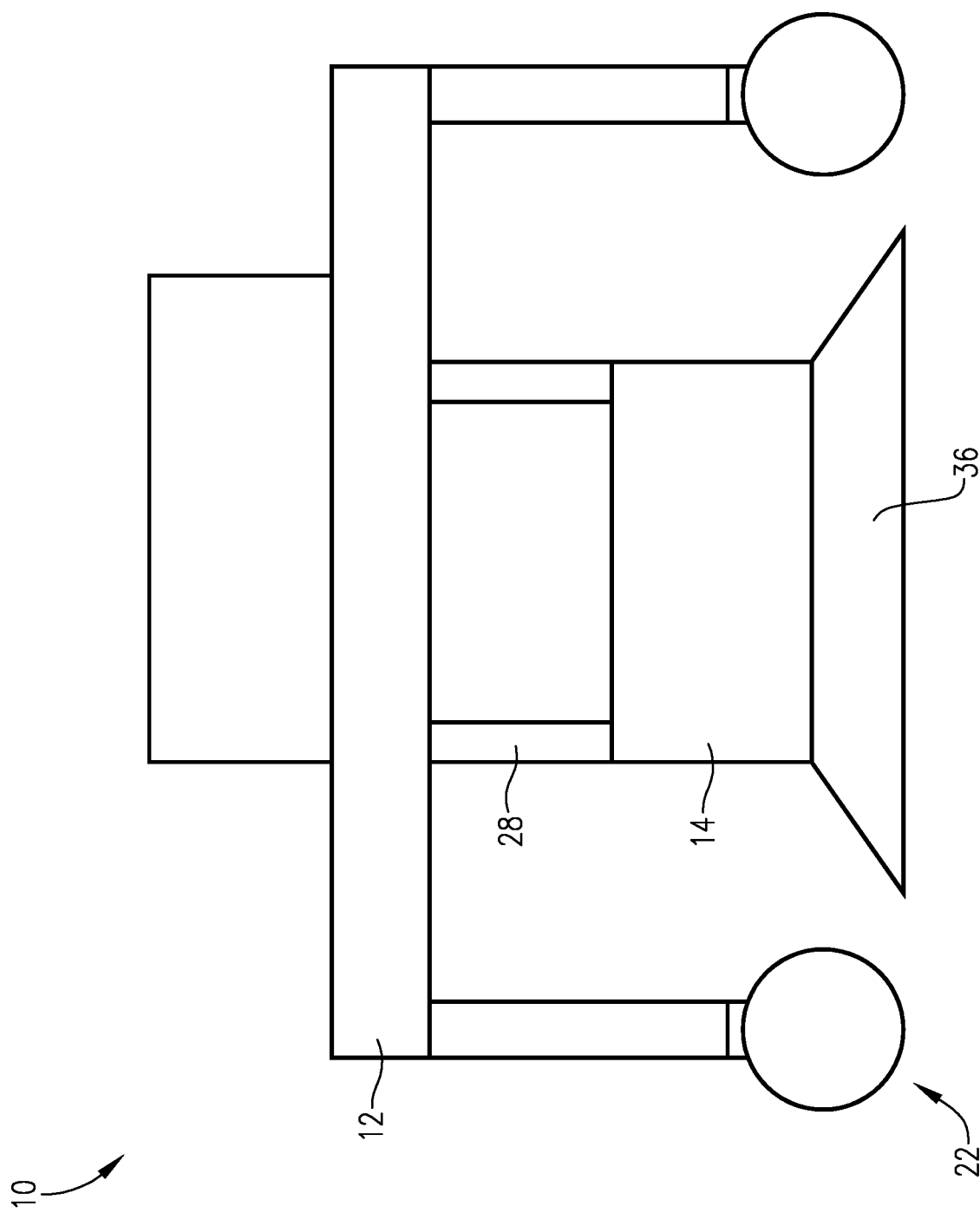

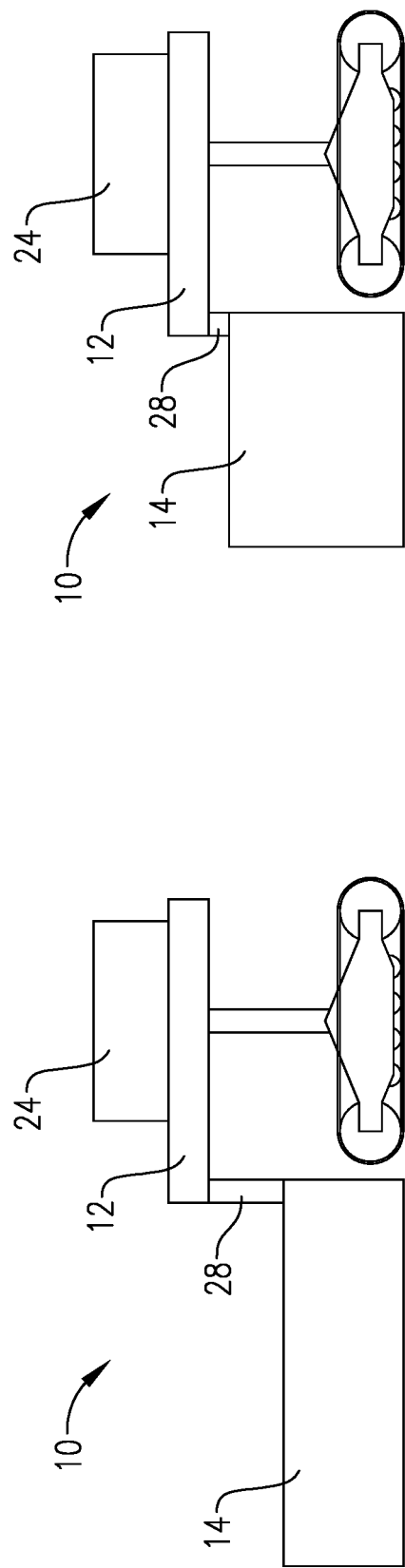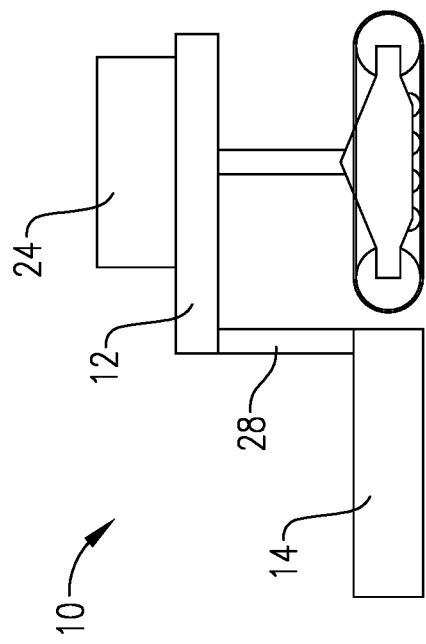

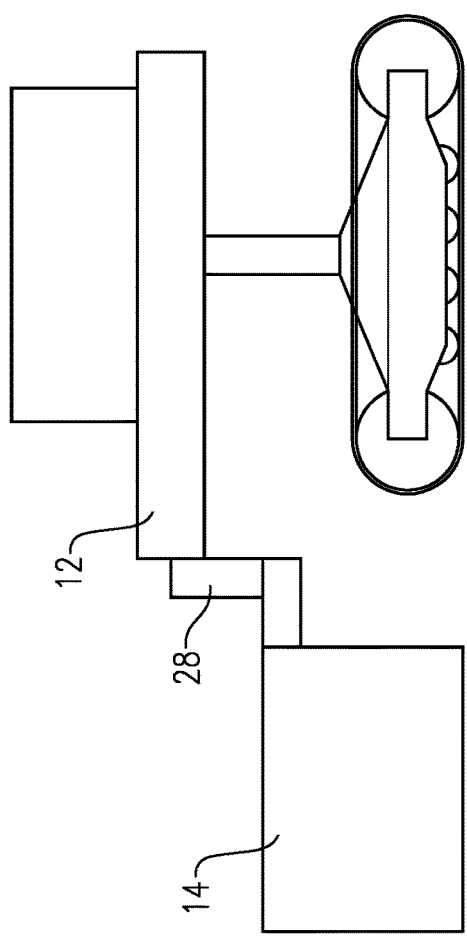
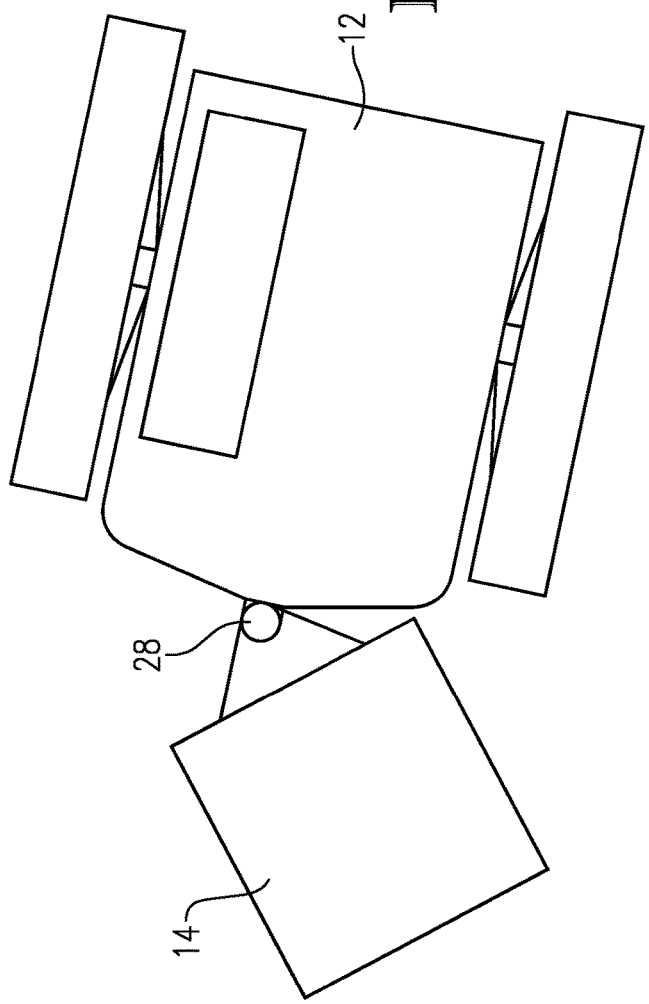

US 11,849,661 B2

AUTONOMOUS AGRICULTURAL SYSTEM

RELATED APPLICATIONS

The present non-provisional patent application claims priority benefit to prior-filed U.S. Provisional Patent Application Ser. No. 62/890,345, filed on Aug. 22, 2019, and entitled "AUTONOMOUS AGRICULTURAL SYSTEM," the entirety of which is hereby incorporated by reference into the present non-provisional patent application.

FIELD OF THE INVENTION

Embodiments of the present invention are directed to systems and methods for performing autonomous agricultural operations, such as soil manipulation, seed planting, plant treatment, crop harvesting, and the like.

BACKGROUND OF THE INVENTION

Standard agricultural operations are normally performed by a tractor pulling an agricultural implement through a field. Generally, however, such operations require an operator to be present to control the agricultural operations. Commonly, the operator will be positioned within a cab of the tractor so as to pilot the tractor and operate the components of the implement. It would be beneficial if such agricultural operations could be performed in an automated fashion without the need for an operator, so as to increase the efficiencies of performing agricultural operations.

In addition, it would be beneficial if there existed a universal automated machine that could couple with a variety of different implements such that various types of agricultural operations could be performed using the automated machine. Furthermore, it would be beneficial if the automated machine and the implement could communicate and exchange power, such that the resulting system could maximize operating efficiencies. Such efficiencies might include optimization of traction, floatation, soil compaction, field usage, soil manipulation, seed planting, plant/soil treatment, crop harvesting, and the like.

SUMMARY OF THE INVENTION

In one embodiment of the present invention, there is provided an autonomous agricultural system comprising a mobile power unit including a frame and a power supply. A position of the power supply is shiftable in at least two dimensions with respect to the frame of the mobile power unit. The autonomous agricultural system additionally includes an implement releasably secured to the mobile power unit. The mobile power unit is configured to transport the implement. The mobile power unit is further configured to provide power from the power supply to the implement.

An additional embodiment of the present invention includes an autonomous agricultural system comprising a mobile power unit including a power supply and one or more drive mechanisms. The system additionally includes a monitoring system for measuring loads on each of the one or more drive mechanisms. The system further includes an implement releasably secured to the mobile power unit. The mobile power unit is configured to transport the implement. The mobile power unit is further configured to provide power from the power supply to the implement.

An additional embodiment of the present invention includes an autonomous agricultural system comprising a mobile power unit including a power supply and one or more drive mechanisms. The system further includes an implement releasably secured to the mobile power unit. The implement includes one or more drive mechanisms. The implement is releasably secured to the mobile power unit via an articulated coupling, with the autonomous agricultural system steered through the articulated coupling. The mobile power unit is configured to transport the implement. The mobile power unit is further configured to provide power from the power supply to the implement.

Embodiments of the present invention additionally include an autonomous agricultural system comprising a mobile power unit including a power supply and one or more drive mechanisms. The system additionally includes an implement releasably secured to the mobile power unit. The system further includes a track removal component configured to follow behind the mobile power unit to modify ground soil to remove tracks formed in the ground soil by the drive elements of the mobile power unit. The mobile power unit is configured to transport the implement. The mobile power unit is further configured to provide power from the power supply to the implement.

An additional embodiment of the present invention includes an autonomous agricultural system comprising a mobile power unit including a power supply, and an implement releasably secured to the mobile power unit. The system further includes a drive-over assembly associated with the implement. The drive-over assembly is configured to permit the mobile power unit to drive on top of the drive-over assembly to facilitate coupling of the implement to the mobile power unit. The mobile power unit is configured to transport the implement. The mobile power unit is further configured to provide power from the power supply to the implement.

A further embodiment of the present invention includes an autonomous agricultural system comprising a mobile power unit including a power supply, and an implement releasably secured to the mobile power unit. The system further includes a connection assembly for facilitating connection between the implement and the mobile power unit. The connection assembly includes a hitch point at which the implement is secured to the mobile power unit. The connection assembly is configured such that a position of the hitch point is adjustable. The mobile power unit is configured to transport the implement. The mobile power unit is further configured to provide power from the power supply to the implement.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE FIGURES

Embodiments of the present invention are described herein with reference to the following drawing figures, wherein:

FIG. 7 is a side elevation view of an autonomous agricultural system comprising a mobile power unit and an implement coupled with the mobile power unit via a 5th-wheel type coupling assembly;

FIG. 8 is a front elevation view of an autonomous agricultural system comprising a mobile power unit and an implement, with the implement comprising a drive-over assembly to facilitate coupling of the implement to the mobile power unit;

FIG. 9 is a side elevation view of the autonomous agricultural system from FIG. 8, with a cross-section formed along a drive-alignment section of the drive-over assembly;

FIG. 10a is a side elevation view of an autonomous agricultural system comprising a mobile power unit and an implement coupled with the mobile power unit via a connection assembly, with a hitch point of the connection assembly being at a standard height;

FIG. 10b is a side elevation view of the autonomous agricultural system from FIG. 10a, with the hitch point of the connection assembly being at a raised height;

FIG. 10c is a side elevation view of the autonomous agricultural system from FIGS. 10a and 10b, with the hitch point of the connection assembly being at a lowered height;

FIG. 11a is a side elevation view of an autonomous agricultural system comprising a mobile power unit and an implement coupled with the mobile power unit via a connection assembly, with the connection assembly including a vertical pivot such that the connection assembly comprises an articulated coupling between the mobile power unit and the implement;

FIG. 11b is a top plan view of the autonomous agricultural system of FIG. 11a, particularly showing the mobile power unit and the implement being rotated with respect to each other about an articulation point of the articulated coupling;

Figure 1:
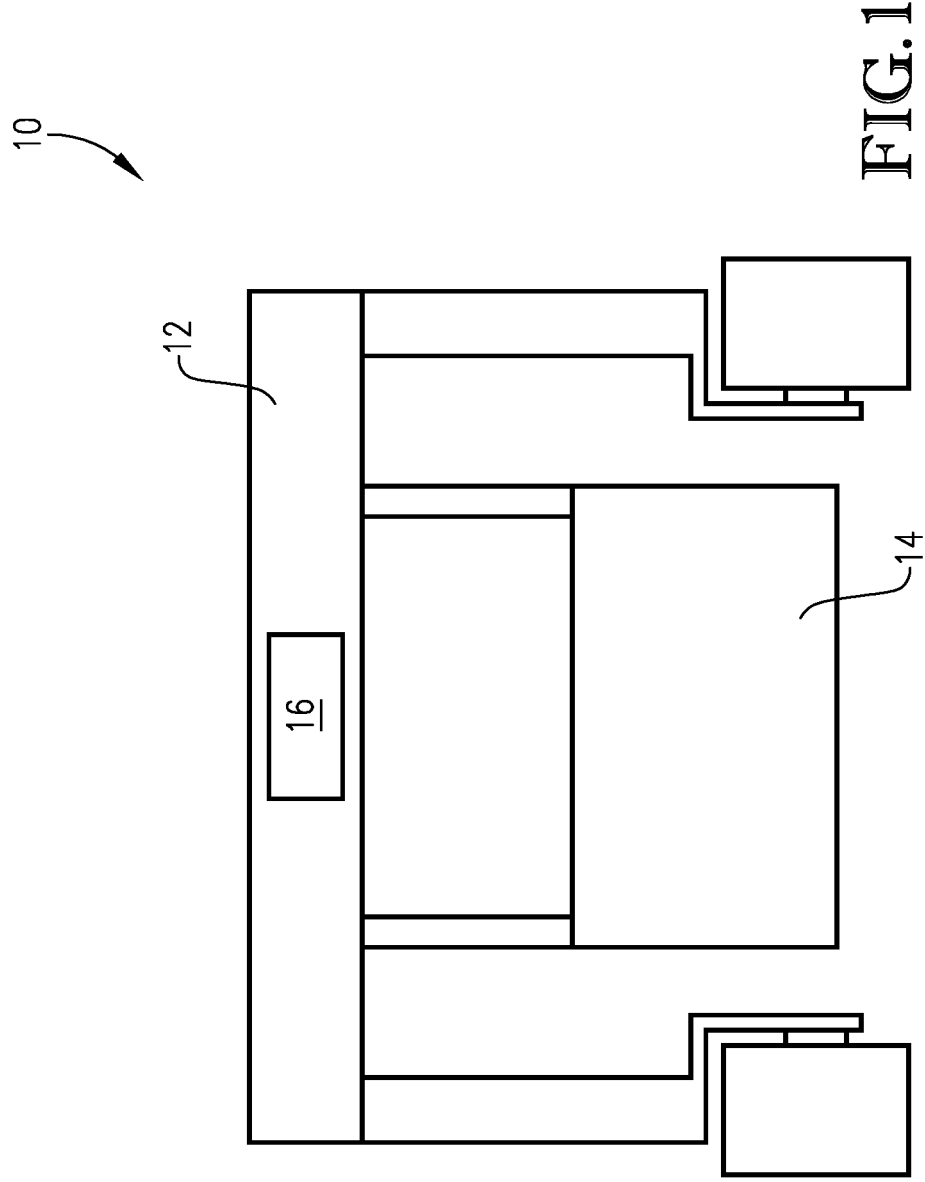
FIG. 1 is a front elevation view of an autonomous agricultural system comprising a mobile power unit and an implement coupled with the mobile power unit.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the present invention references various embodiments. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Embodiments of the present invention are directed to systems and methods for performing autonomous agricultural operations, such as soil manipulation, seed planting, plant/soil treatment, crop harvesting, and the like, as will be described in more detail below. Beginning with FIG. 1, embodiments of the present invention may broadly include an autonomous agricultural system 10 comprising a universal, mobile power unit 12 configured to propel, transport, and/or provide operating power to an interchangeable implement 14 configured to be releasably secured to the power unit 12. As such, the power unit 12 is configured to transport the implement 14 across the ground, such that the implement 14 can perform agricultural operations. The implement 14 may comprise various types of tools configured to perform agricultural operations, such as tiller, coulters, seeders, harvesters, crop sprayers, fertilizer applicator (e.g., a sidedress tool bar), etc. Beneficially, the power unit 12 may be autonomously operated, such that the agricultural operations may be performed autonomously by the power unit 12 transporting and/or powering the implement 14.

For example, a user of the system 10 (e.g., farmer) may have three different implements 14 (e.g., one implement 14 for tilling the ground (e.g., a tiller), one implement 14 for planting seed in the ground (e.g., a seeder), and one implement 14 for harvesting crop (e.g., a harvester)). Beneficially, however, the user of the system 10 may only require a single power unit 12 to operate each of the implements 14. As will be described in more detail below, the power unit 12 is configured to be selectively engaged with one of the implements 14, so as to propel and/or to provide power to the implement 14 such that the implement 14 can perform its intended operation. For example, the power unit 12 may be engaged with a first implement 14 in the form of the tiller to perform tilling operations over a field. Next, upon completion of the tilling, the power unit 12 can disengage from the first implement 14 and engage with a second implement 14 in the form of a planter to perform planting/seeding operation over the field. Next, upon completion of the planting (and in some embodiments after crop has begun to grow in the field), the power unit 12 can disengage from the second implement 14 and engage with a third implement 14 (e.g., a crop sprayer or a fertilizer applicator) to perform treatments operations for the ground soil or the crop in the field. Finally, the power unit 12 can disengage from the third implement 14 and, once crop has grown in the field, can be engaged with a fourth implement 14 in the form of a harvester to harvest the crop that has grown in the field. Thus, only a single power unit 12 is required to perform multiple different agricultural operations. Furthermore, the system 10 is configured to operate autonomously, such that the user of the system 10 does not need to be physically present with the power unit 12 and/or the implement 14 during operations.

In more detail, the power unit 12 and the associated implement 14 are configured to operate in a coordinated manner to perform intended agricultural operations. To accomplish such coordination, system 10 may include a control system 16 that receives inputs/data from various sensors and controls operation of the power unit 12 and/or the associated implement 14 based on such inputs/data. The control system 16 may, as shown in FIG. 1, be incorporated with the power unit 12. Alternatively, the control system 16 may be incorporated with the implement 14 or may be separated from the power unit and implement 14. Regardless, such sensors may include location-determining elements (e.g., global positioning sensors/receivers ("GPS"), global navigation signal system ("GNSS"), real time kinematics (RTK), over-the-air, broadband, wide area network ("WAN"), local area network ("LAN"), etc.), vision-based sensors (e.g., video cameras, infrared (IR) cameras, LIDAR, RADAR, etc.), temperature sensors, moisture sensors, pressure sensors, and the like. To facilitate communication with the sensors, the power unit 12, and the implement 14 to which it is paired, may communicate with the sensors internally (e.g., the control system 16 can communicate with sensors located in, on, or adjacent to the power unit 12 and/or implement 14) and/or externally (e.g., the control system 16 can communicate with sensors located external to the power unit 12 and/or implement 14). As such, the power unit 12 and/or implement 14 will generally include communications components necessary for wired or wireless communication (e.g., radiofrequency transceivers, such as cellular, Wi-Fi, Bluetooth, or the like). As such, the power unit 12 and/or implement 14 may communicate over networks, such as over-the-air networks, broadband, WAN, LAN, etc. Based on the inputs/data from the various sensors, the control system 16 may control operation of the power unit 12 and/or the implement 14, as will be discussed in more detail below.

The control system 16 may include one or more memory elements, such as non-transitory computer readable media and/or firmware, with a computer program stored thereon. The control system 16 may also include one or more processing elements, such as processors, CPUs, FPGAs, etc., which are configured to execute the computer program to perform various functions and features of the system 10 described herein. Thus, it should be understood that certain of the system's 10 functions and features discussed above and below are performed by execution of the computer program (stored on the memory elements) by the processing elements. For example, the control system 16 may be configured to (by the processing elements executing the computer program stored on the memory elements) (i) obtain information/data from various sensors associated with the system 10 (e.g., location-determining element in the form of a GPS receiver), and (ii) control the position, motion, and various operations of the power unit 12 and/or the implement 14 based on such sensor information/data.

In some embodiments, the system 10 may include a plurality of power units 12, each perhaps being paired with at least one separate implement 14. In certain of such embodiments, each power unit 12 may be independently controlled, e.g., autonomously and/or remotely. For example, each of the power units 12 may be controlled autonomously via one or more control systems that individually operate the power units 12 and/or the implements 14 based on data obtained from various sensors. Alternatively, the power units 12 may be remotely controlled (e.g., remotely steerable) by a remote operator. In additional embodiments, the power units 12 may work together (e.g., as a swarm) to perform agricultural operations. In such embodiments, the multiple power units 12 and paired implements 14 may communicate (e.g., wirelessly) with each other to aid in autonomous guidance and to maximize operational efficiencies. For example, each mobile power unit 12 may be configured to communicate with the other power units 12 to create one or more feedback loops to improve guidance, improve stability, maximize/optimize traction, and/or maximize/optimize floatation of the power units 12 and/or their associated implements 14. In some embodiments, the control system 16 will incorporate machine learning techniques (e.g., using the data obtained from the plurality of power units 12 and/or implements) to continually improve performance of the system 10.

Figure 2:
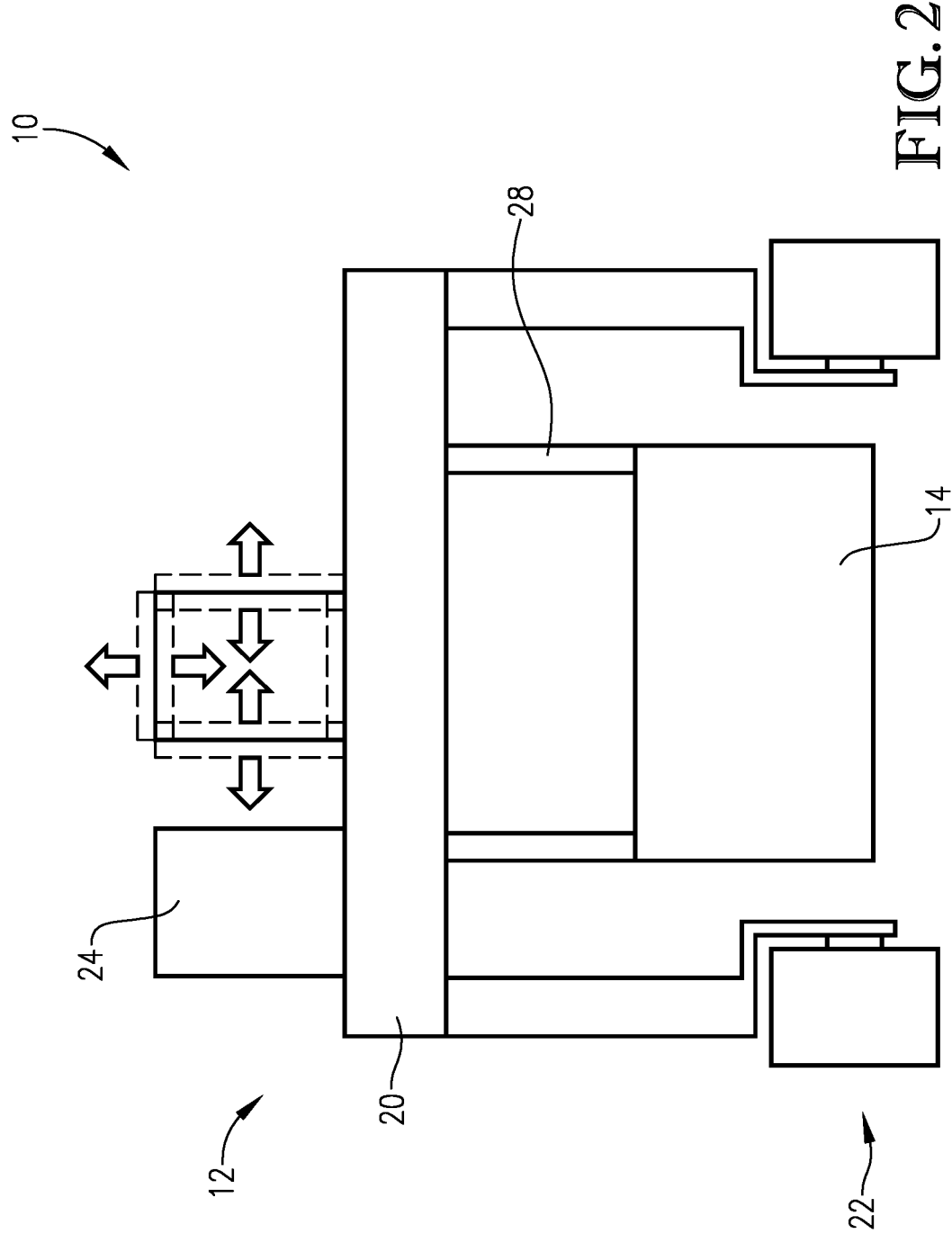
FIG. 2 is a front elevation view of the autonomous agricultural system from FIG. 1, further comprising a power supply having a position that is shiftable, laterally, with respect to a frame of the mobile power unit.

Turing to the power unit 12 in more detail, the power unit 12 may comprise a frame 20, a drive mechanism 22, and a power supply 24, as illustrated in FIG. 2. The drive mechanism 22 may support the frame 20 on the ground and may comprise one or more wheels or tracks, which are used to propel and maneuver the power unit 12. The drive mechanism 22 may be configured to provide tractive power to the power unit 12 such that the power unit 12 can maneuver in generally any direction (e.g., forward, rearward, rightward, leftward, and oblique directions). The drive mechanism 22 may be powered by the power supply 24, which may comprise one or more batteries that store and provide electrical power to the drive mechanism 22 and to other components of the power unit 12. In additional embodiments, the power supply 24 may comprise one or more combustion engines (to generate rotary power), electrical generators (to generate electrical power), hydraulic pumps (to generate hydraulic power), fuel tanks/pumps (to store and provide fuel), or the like. The drive mechanism 22 may include various types of motors (e.g., electric or hydraulic motors powered by the power supply 24) to provide tractive power to the wheels/tracks of the drive mechanism 22. As will be discussed in more detail below, the power supply 24 may also provide power to the implement 14 to which the power unit 12 is operably connected.

Figure 3:
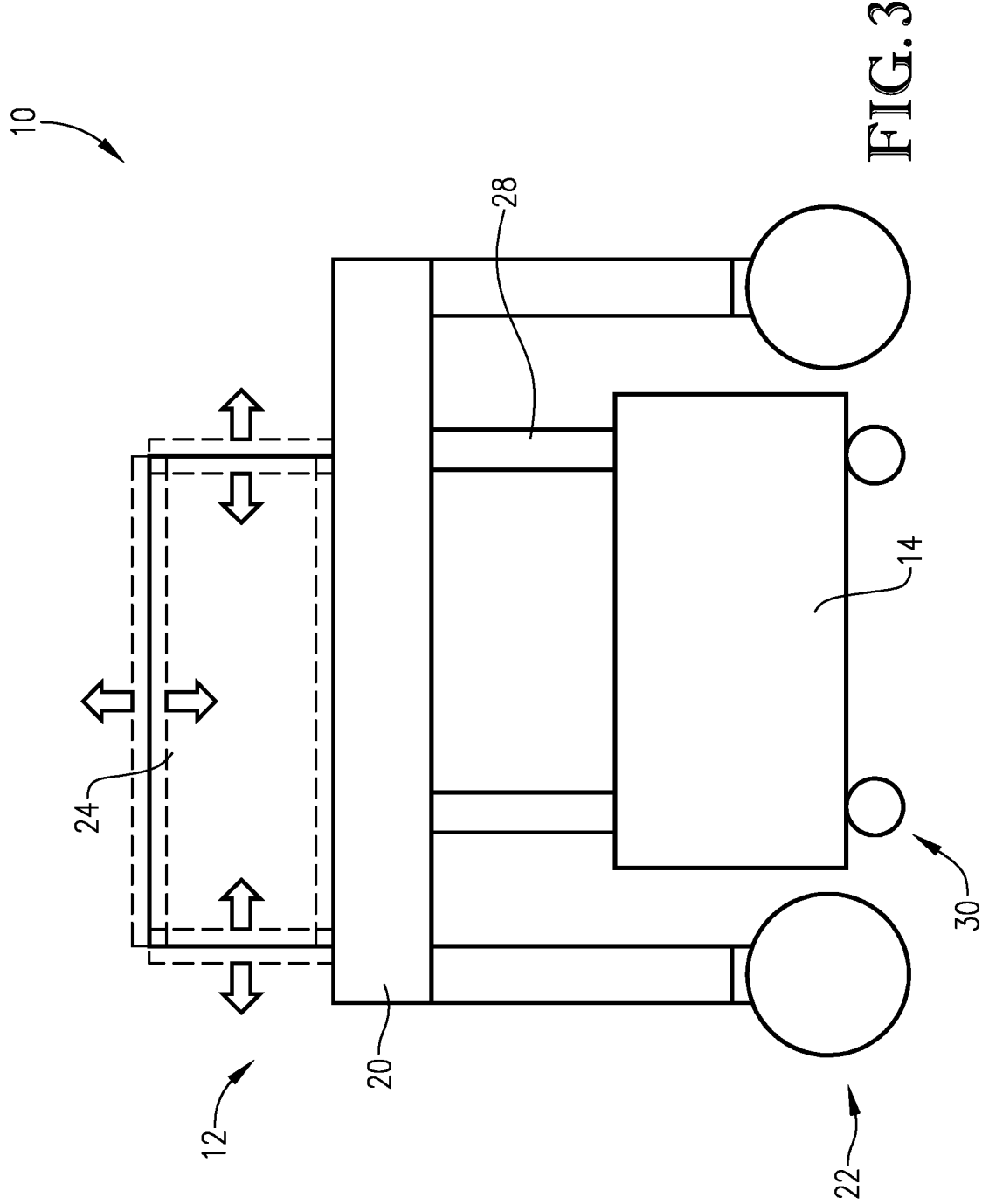
FIG. 3 is a side elevation view of the autonomous agricultural system from FIG. 2, with each of the mobile power unit and the implement including drive mechanisms, and further illustrating the power supply configured to shift longitudinal and vertically.

In certain embodiments, the power supply 24 may be supported by the frame 20 of the power unit 12. As an exemplary embodiment, for instance, FIGS. 2 and 3 illustrates the power supply 24 being supported on a top of the frame 20 of the power unit 12. In certain embodiments, at least a portion of the power supply 24 may be shiftable on the power unit 12 parallel to, perpendicular with, or at an angle with respect to the direction of travel of the power unit 12 (e.g., forward, rearward, rightward, leftward, and oblique directions, as well as upward and downward directions) so as to enhance weight distribution, stability, traction (i.e., to improve tractional friction between the system 10 and the ground), or floatation (i.e., to minimize compaction of the ground soil) of the system 10. Stated differently, the shifting of the power supply 24 may be used to alter weight bias of the components of the system 10 to optimize traction and/or to minimize soil compaction. In more detail, the power supply 24 is configured to, in some embodiments, shift its position in at least two dimensions (e.g., laterally and longitudinally) with respect to the frame 20 of the power unit 12. In some additional embodiments, the power supply 24 is configured to shift its position in at least three dimensions (e.g., laterally, longitudinally, and vertically) with respect to the frame 20 of the power unit 12. The shifting of the power supply 24 may be based on an automatic feedback loop between the power unit 12 and the implement 14. For example, each of the power unit and the implement 14 may include load sensors configured to measure the load (e.g., ground pressure representative of traction and soil compression) imparted by each of the power unit 12 and the implement 14. The power unit 12 and the implement 14 may communicate their respective load information to each other, such that the control system 16 may shift the position of the power supply 24 as necessary based on the load information.

The power supply 24 may comprise a plurality of components (e.g., batteries, combustion engines, hydraulic pumps, fuel tanks, etc.) each of which are shiftable on the frame of the power unit 12 independently of one another. To accomplish such shifting, the power supply 24 components may be supported on the frame 20 via tracks, such that one or more actuators or motors can shift the position of the power supply 24 components by actuating such components along the tracks.

Remaining with FIG. 2, the system 10 may include a connection assembly 28 configured to operably and releasably connect the power unit 12 to the implement 14. The connection assembly 28 may comprise various types of mechanisms, some of which are discussed in more detail below, configured to permit the power unit 12 to support, propel, and/or provide power to the implement 14. For example, the power unit 12 may be configured to pull or push the implement 14. In certain embodiments, the connection assembly 28 may also be configured to transfer power from the power unit 12 to the implement (e.g., from the power supply 24). For instance, the power supply 24 may provide rotary power, electrical power, hydraulic power, and/or fuel to the implement 14. In some embodiments, the connection assembly 28 may be part of the power unit 12. Alternatively, the connection assembly 28 may be part of the implement 14. In further alternatives, a portion of the connection assembly 28 may form part of the power unit 12 while another portion of the connection assembly 28 may form part of the implement 14. In even further alternatives, the connection assembly 28 may be a mechanism that is independent of either of the power unit 12 and the implement 14.

As shown in FIG. 3, the implement 14 may also have its own drive mechanism 30. As with the power unit, the drive mechanism 30 of the implement 14 may comprise wheels, tracks, or the like. In certain embodiments, the drive mechanism 30 may support the implement on the ground and may simply be neutrally configured to permit the implement 14 to move when propelled by the power unit 12. In some alternative embodiments, the drive mechanism 30 may be configured to receive power so as to provide tractive power to the implement 14 such that the implement 14 may be at least partially self-propelled. In such embodiments, the implement 14 may include receive power from the power supply 24 of the power unit 12, such as through the connection assembly 28 connecting the power unit 12 and the implement 14. The drive mechanism 30 may include various types of motors (e.g., electric or hydraulic motors powered by the power supply 24) to provide tractive power to the wheels/tracks of the drive mechanism 30.

Power may also be supplied from the power unit 12 to the implement 14 (e.g., from the power supply 24 via the connection assembly 28) so as to provide power to other tractive components of the implement 14. Such other tractive components include components of the implement 14 that are configured to engage with the ground during operation of the system 10, such as depth-control wheels or tracks, finishing reels, tillage discs, furrow opening discs, packer wheels, etc. In further embodiments, actuation of such tractive components on or in the ground may generate power which can be captured and provided to one or more additional components of the implement 14.

As noted above, in certain embodiments, the implement 14 will comprise an agricultural implement configured to modify the ground soil (e.g., tiller). As such, the implement 14 may include tractive components in the form of one or more of the following: tillage discs, furrow opening discs, packer wheels, harrows, finishing reels, or other rotary elements. As was noted above, such tractive components may be used to help propel or provide tractive effort to various components of the system 10 (e.g., the implement 14 and/or the power unit 12) and/or to provide operating power to other components of the implement 14 and/or the power unit 12. Alternatively, or in addition, in certain embodiments, the implement 14 will comprise an agricultural implement configured to insert or apply material (e.g., seed or treatment, such as fertilizer, growth regulator, biological organism, herbicide, and/or pesticide/insecticide) into or onto the ground. As such, the implement 14 may include tractive components in the form of one or more of the following: furrow opening discs, depth wheels, closing wheels, packer wheels, finishing reels, or other rotary elements. As was noted above, such tractive components may be used to help propel or provide tractive effort to various components of the system 10 (e.g., the implement 14 and/or the power unit 12) and/or to provide operating power to other components of the implement 14 and/or the power unit 12. Alternatively, or in addition, in certain embodiments, the implement 14 will comprise an agricultural implement configured to harvest crop from the ground. As such, the implement 14 may include tractive components in the form of harvesting elements or other rotary elements. As was noted above, such tractive components may be used to help propel or provide tractive effort to various components of the system 10 (e.g., the implement 14 and/or the power unit 12) and/or to provide operating power to other components of the implement 14 and/or the power unit 12.

In certain embodiments, the computer program stored on the memory elements associated with the control system 16 may include a prescription file that defines one or more target parameters for the system 10. The system 10 may collect sensor data (from the sensors of the system 10) associated with the agricultural operations being performed by the system 10 (e.g., the power unit 12 and/or implement 14) in real-time (or near real-time), and the control system 10 may change operating parameters of the system 10 such that the operating parameters fall within the target parameters. As an example, a power unit 12 may be propelling an implement 14 in the form of a tiller through a field performing tilling operations. The control system 16 may collect various sensor data associated with the field, such as soil smoothness, vegetation content, etc. Such sensor data may be collected from sensors in the form of optical cameras, infrared (IR) cameras, light detection and ranging ("LIDAR) cameras, etc. The control system 16 may compare such sensors data with the target parameters to determine if the current operating parameters of the system 10 are in line with the target parameters or, instead, require changing. If the operating parameters require changing so as to be brought in line with the target parameters, the control system 16 may adjust one or more operating parameters of the system 10 accordingly, For example, if the ground soil is determined to be more rough than specified by the target parameters, the control system 16 may change various operating parameters of the implement 14 to more significantly smoothen out the soil. Such operating parameters may include, for instance, increasing/decreasing the depth or angle of the tillage discs, finishing wheels, etc.

In some embodiments, the power unit 12 will be configured to support at least portion of the weight of the implement 14. For example, as shown in FIGS. 1 and 2, the implement 14 may be supported underneath the power unit 12, via the connection assembly 28, in a manner that permits at least a portion of the weight of the implement 14 to be supported by the power unit 12. The connection assembly 28 between the power unit 12 and the implement 14 may permit the power unit 12 to entirely lift the implement 14 off the ground (or at least reduce the implement 14 load) during transportation. In certain alternatives, the implement 14 may be positioned in front or behind the power unit 12. In some other embodiments, the implement 14 may comprise a foldable wing implement coupled to the power unit 12 in a manner to permit the implement 14 to be folded with respect to the power unit 12. In some specific embodiments, the power unit 12 may support two or more implements 14 that are each configured in the form of a support wing. As such, the implements 14 may each be folded up off of the ground (partially or fully), with their weight supported (partially or fully) by the power unit 12.

In some additional embodiments, weight may be shifted or transferred between (e.g., back and forth) the power unit 12 and the implement 14 for preferential operations. For example, weight may be transferred (e.g., via shifting of the power supply 24 and/or via adjustment of actuators the connection assembly 28) from the power unit 12 to the implement 14 to increase traction or downforce of the implement 14. Such a feature may be beneficial, for instance, when the implement 14 is a no-till drill that is required to achieve a specified seed depth in hard packed soil. In other embodiments, weight may be transferred from the implement 14 to the power unit 12 to increase flotation (e.g., reduce soil compaction) of the implement 14. Furthermore, weight may be transferred between the power unit 12 and the implement 14 to maximize weight distribution, stability, traction, and/or floatation of the combination of the power unit 12 and the implement 14.

As used herein, directional terms are based on the direction of travel of the system 10. Thus, the terms "front" and "forward" mean a longitudinal direction towards an end of the power unit 12 and/or the implement 14 that faces a direction of travel of the system 10. The terms "back," "rear", or "rearward" mean a longitudinal direction towards an opposite end of the power unit 12 and/or the implement that faces opposite the direction of travel. The term "left" or "leftward" means a left lateral direction from the perspective of an individual facing the direction of travel, while the term "right" or "rightward" means a right lateral direction from the perspective of an individual facing the direction of travel.

Figure 4:
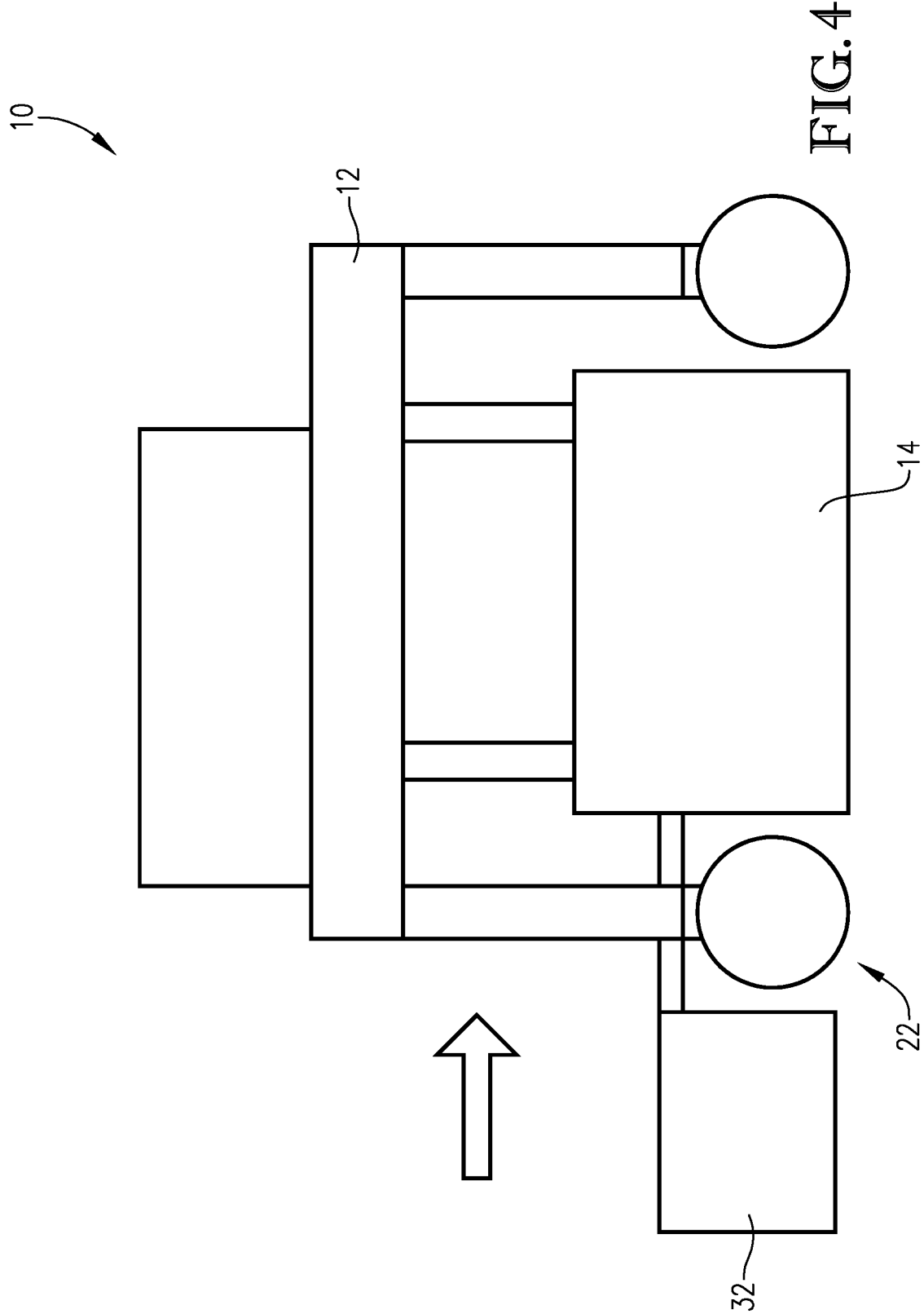
FIG. 4 is another side elevation view of an autonomous agricultural system comprising a mobile power unit and an implement, with the system further including a track removal component configured to remove tracks formed by drive mechanisms of the mobile power unit and/or the implement.

In certain embodiments, as illustrated in FIG. 4, the power unit 12 and/or the implement 14 may include and/or carry a track removal component 32 configured to modify (e.g., smoothen, remove, or cover) tracks, impressions, and/or indentions formed into the ground soil by the drive mechanisms 22, 30 (e.g., tires and/or tracks) of the power unit 12 and/or implement 14. Such a track removal component 32 may comprise a blade (e.g., a plow blade), tillage discs, finishing reels, a rotating brush, or the like. In some embodiments, each of the power unit 12 and the implement 14 will be associated with an individual track removal component 32. As shown in FIG. 4, in some embodiments, the power unit 12 will support and carry an implement 14 positioned underneath the power unit 12 (generally moving in a travel direction indicated by the arrow shown in the figure). The implement 14 may include, support, and/or or be associated with the track removal component 32 positioned behind/reward of the power unit 12 and/or the implement 14. Specifically, the track removal component 32 may be connected to the rear of the implement 14 via a linkage or connection, such that the track removal component 32 can be pulled behind the implement 14 and/or the power unit 12. As a result, the track removal component will be configured to remove or cover tracks formed into the ground soil by the drive mechanisms 22, 30 (e.g., tires and/or tracks) of the power unit 12 and/or the implement 14. As a result of such track removal, the usable area of the field in which the system 10 is operating can be increased (e.g., more ground soil is available for additional planting and crop growth). As noted above, however, in additional embodiments, the power unit 12 may include, support, and/or be associated with its own track removal component 32.

Figure 5:
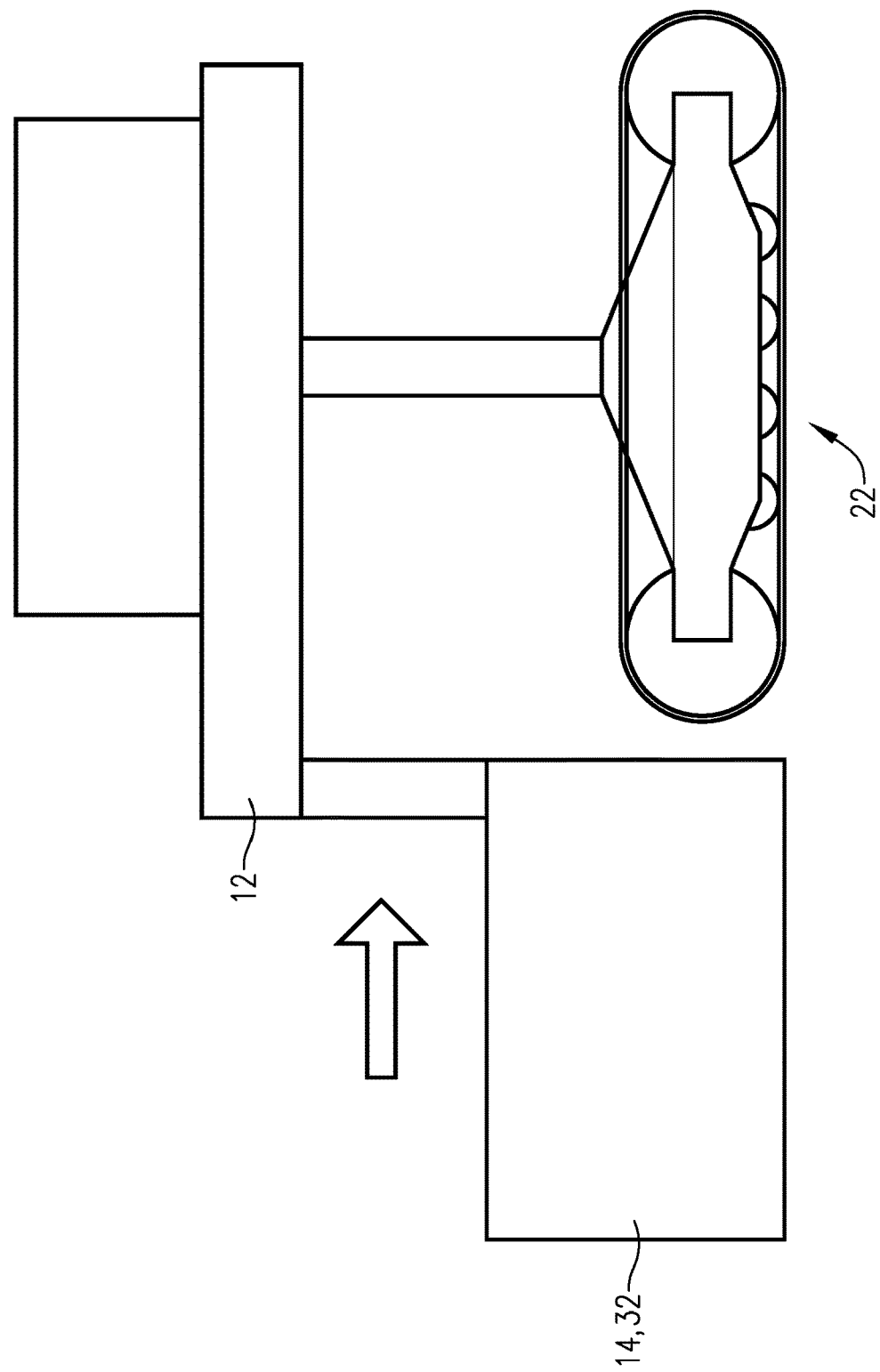
FIG. 5 is a further side elevation view of an autonomous agricultural system comprising a mobile power unit and an implement, with the implement comprising an integrated track removal component configured to remove tracks formed by drive mechanisms of the mobile power unit and/or the implement.

As illustrated in FIG. 5, the track removal component 32 may be incorporated as an integral part of the implement 14. The power unit 12 may carry the implement 14 and the track removal component 32 behind the power unit 12 (generally moving in a travel direction indicated by the arrow). As a result, the track removal component 32 will be configured to remove or cover tracks formed into the ground soil by the drive mechanisms 22, 30 (e.g., tires and/or tracks) of the power unit 12 and/or the implement 14.

In some embodiments, the control system 16 associated with the system 10 will be configured as a monitoring system to monitor loads at each of the drive mechanisms 22, 30 (e.g., wheels and/or tracks) of the power unit 12 and the implement 14. The monitoring system may monitor the loads (e.g., via the load sensors associated with the drive mechanisms 22, 30) so as to maximize the traction of each (or subset) of the drive mechanisms 22, 30. Alternatively, or in addition, the monitoring system may monitor the loads (e.g., via the load sensors associated with the drive mechanisms 22, 30) so as to minimize the compaction of each (or subset) of the drive mechanisms 22, 30. In more detail, the control system 16 (and/or the monitoring system) may maximize the traction or minimize the compaction of the system 10 by shifting and/or adjusting weight or forces back and forth between the power unit 12 and the implement 14 based on the loads measured via the load sensors associated with the drive mechanisms 22, 30. Such shifting and/or adjustment of weight/forces may be performed by adjusting the position of the power supply 24, as previously described, and/or by adjusting actuators associated with the connection assembly 28 (such actuators are discussed in more detail below).

In some additional embodiments, the control system 16 (and/or the monitoring system) may maximize the traction or minimize the compaction of the system 10 by adjusting the tractive components of the implement 14. For example, in certain embodiments, the implement 14 may include tractive components in the form of ground-engaging tools used to perform agricultural operations. As was described above, such tractive components may include depth-control wheels, packer wheels, tillage discs, furrow opening discs, packer wheels, harrows, finishing reels, or the like. Based on the loads measured by the monitoring system (e.g., at the drive mechanisms 22, 30), the control system 16 (and/or the monitoring system) may make necessary adjustments to the tractive components of the implement 14 to maximize the traction or minimize the compaction of the system 10, including any necessary adjustments to the drive mechanisms 22, 30 of the power unit 12 and implement 14, as well as to the tractive components of the implement 14. In additional embodiments, the monitoring system may monitor the loads at the tractive components of the implement 14 and make adjustments to such tractive components (e.g., raise, lower, adjust angular position, etc.), so as to aid in maximizing the traction or minimizing the compaction of the system 10 (including of the tractive components of the implement 14). Weight distribution of the system 10, as well as the position of the power supply 24, may also be adjusted based on the load measurements obtained for the tractive components.

Figure 6:
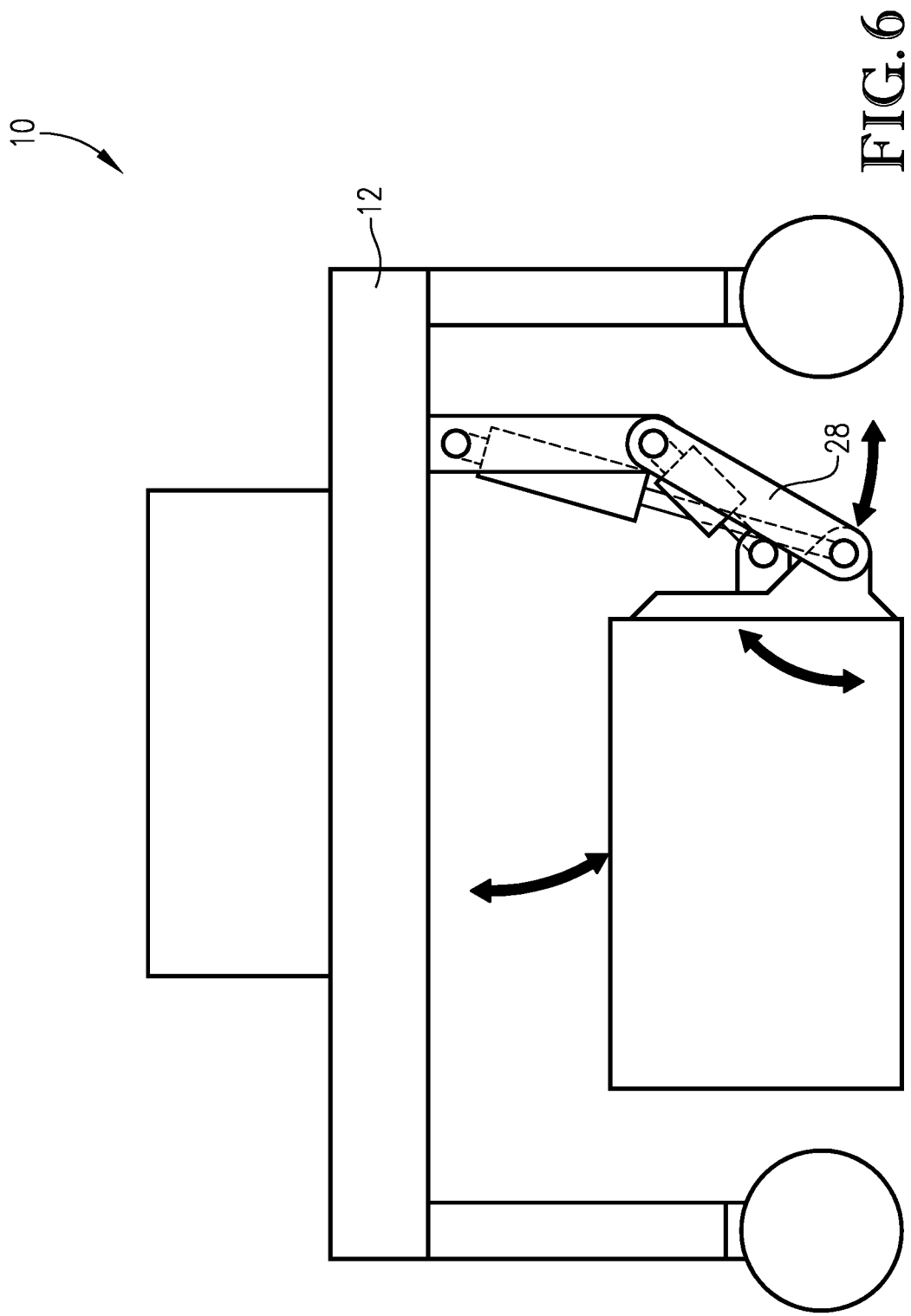
FIG. 6 is a side elevation view of an autonomous agricultural system comprising a mobile power unit and an implement coupled with the mobile power unit via a skid-steer type quick coupling assembly.

Returning to the connection assembly 28 used to operably connect the implement 14 to the power unit 12, embodiments may provide for various type of mechanisms to be used. For example, as illustrated in FIG. 6, the connection assembly 28 may comprise a skid-steer type "quick coupling assembly" (such as may be used to connect implements to skid-steer loaders) used to releasably secure the implement 14 to the power unit 12. The skid-steer quick coupling assembly may permit quick and efficient coupling of various types of implements 14 to the power unit 12. In addition, the connection assembly 28 may include one or more actuators for adjusting the position of the implement 14 with respect to the power unit 12. For instance, as shown in FIG. 6, an upper actuator (e.g., a hydraulic or pneumatic cylinder, or an electric linear or rotary actuator) may be configured to raise and lower the implement 14 with respect to the power unit 12. A lower actuator (e.g., a hydraulic or pneumatic cylinder, or an electric linear or rotary actuator) may be configured to tilt the implement 14 with respect to the power unit 12. Such actuators may also be used to shift weight back and forth between the power unit 12 and the implement 14. For example, the actuators may force the implement 14 downward (e.g., into the ground) to reduce weight/force of the power unit 12 with respect to the ground (and conversely increasing the weight/force of the implement 14 with respect to the ground), while the actuators may raise the implement 14 (e.g., out of or away from the ground) to increase the weight/force of the power unit 12 with respect to the ground (and conversely reducing the weight/force of the implement 14 with respect to the ground).

Alternatively, as shown in FIG. 7, the connection assembly 28 may comprise a $5^{th}$-wheel type coupling assembly (such as may be used between tractors and $5^{th}$-wheel trailers) which may be used to releasably secure the implement 14 to the power unit 12. The $5^{th}$-wheel coupling assembly may permit quick and efficient coupling of various types of implements 14 to the power unit 12.

Turning to FIG. 8, in certain embodiments, the implement 14 may include and/or be associated with a drive-over segment 34 that facilitates the ability of the power unit 12 to releasably engage with the implement 14. For example, the drive-over segment 34 may comprise one or more drive-alignment sections 36, each of which are configured to align with one of the wheels or tracks of the drive mechanism 22 of the power unit 12, such that the power unit 12 can drive over and/or on top of the implement 14 and/or drive-over segment 34. For instance, the drive mechanism 22 of the power unit 12 shown in FIG. 8 comprises two wheels. As such, drive-over segment 34 of the implement 14 includes two drive-alignment sections 36 over which the wheels of the power unit 12 can travel during engagement/disengagement of the implement 14 with the power unit 12. Specifically, when connecting the implement 14 to the power unit 12, the power unit 12 can drive over the implement 14, and in particular over the drive-over segment 34 of the implement 14 for purposes of engaging the implement 14 to the power unit 12. Each of the wheels of the drive mechanism 22 will generally be aligned with the drive-alignment section 36, such that the wheels can travel over the drive-alignment section 36. FIG. 8 is a side elevation view of the system 10 from FIG. 8, with the drive-over segment 34 being cross-sectioned at one of the drive-alignment sections 36. As shown in FIG. 8, portions of the drive-over segment 34 laterally adjacent (i.e., to the side) of the drive-alignment sections 36 may be angled upward so as to direct the wheels downward, towards the drive-alignment sections 36 should the wheels be misaligned.

Regardless, once the wheels or tracks of the drive mechanism 22 of the power unit 12 are aligned with the drive-alignment sections 36 of the drive-over segment 34, the wheels or tracks can be driven over the drive-alignment sections 36 to properly align the power unit 12 to the implement 14 to permit proper connection via the connection assembly 28. As a result, the drive-over segment 34 may enhance proper alignment between the power unit 12 and the implement 14 for efficient coupling. Such proper alignment may include proper lateral alignment (e.g., left/right alignment), proper longitudinal alignment (e.g., forward/rearward alignment), and/or proper vertical alignment (e.g., up/down alignment) between the power unit 12 and the implement 14 to permit proper coupling via the connection assembly 28. In some embodiments, the coupling between the power unit 12 and the implement 14 may be performed in an automated/autonomous manner (i.e., via an automated process). Specifically, data associated with position sensors associated with the power unit 12 and the implement 14 may be continuously exchanged, such that the power unit 12 can automatedly/autonomously position itself in an appropriate position with respect to the implement 14 (or the implement 14 may automatedly/autonomously position itself in an appropriate position with respect to the power unit 12), such that the implement 14 can be coupled with the power unit 12. The process of coupling, via the connection assembly 28, may also be automatedly/autonomously performed once the power unit 12 and the implement 14 are in the appropriate relative positions.

The drive-over segment 34 may additionally permit the power unit and the implement with to be configured in various preferred operational and transport orientations. For example, in embodiments in which the implement 14 has a significant length, the power unit 12 may drive over the drive-over segment 34 to couple with the implement 14. The power unit 12 may initially propel the implement 14 in a transport configuration, in which the length of the implement 14 is orientated longitudinally (i.e., forward/rearward) with respect to a direction of travel of the power unit 12. Upon reaching an operating area, the power unit 12 may shift the position of the implement 14 via actuation (e.g., rotation) of the connection assembly 28 such that the power unit 12 and implement 14 are in an operational configuration, in which the length of the implement 14 is orientated laterally (i.e., leftward/rightward) with respect to a direction of travel of the power unit 12. In alternative embodiments, the system 10 may be transitioned to the operational configuration by the implement 14 remaining stationary, while the power unit maneuvers or shifts its position with respect to the implement 14 until the position of the implement 14 is orientated laterally (i.e., leftward/rightward) with respect to a direction of travel of the power unit 12. Regardless, in such an operational configuration, the power unit 12 can propel the implement 14 so as to perform agricultural operations.

Turning to FIGS. 10a-10c, the connection assembly 28 used to connect the power unit 12 with the implement 14 may comprise a height adjustable hitch to facilitate coupling and operating with various types and sizes of implements 14. Such height adjustability may be beneficial for coupling the power unit 12 to implements 14 of varying heights. For example, ground-engaging implements (e.g., tillers, scrapers, etc.) may prefer a lower hitch point (i.e., the point at which the implement 14 is connected to and/or supported by the power unit 12) so as to enhance load/force distribution. In contrast, non-ground-engaging (e.g., sprayers) implements may prefer a higher hitch point. Referring to the drawings, FIG. 10a illustrates the connection assembly 28 configured with the hitch point at a standard height and/or vertical level, such that the power unit 12 can operably couple with an implement 14 having a generally standard height. FIG. 10b illustrates the connection assembly 28 configured with the hitch point at a raised height and/or vertical level, such that the power unit 12 can operably couple with an implement 14 having a generally increased height (e.g., a sprayer). Finally, FIG. 10c illustrates the connection assembly 28 configured with the hitch point at a lowered height and/or vertical level, such that the power unit 12 can operably couple with an implement 14 having a generally lowered height (e.g., a tiller or scraper). Embodiments may provide for the connection assembly 28 to be vertically raised and lower via power provided by the power supply 24 of the power unit 12 (e.g., electrically, hydraulically, pneumatically, etc.).

Turning to FIGS. 11a and 11b, the connection assembly 28 may include a vertical pivot, such that the power unit 12 and the implement 14 may rotate (e.g., on a vertical axis) with respect to each other during maneuvering and agricultural operations. As such, the connection assembly 28 may form an articulated coupling. In some additional embodiments (not illustrated in FIGS. 11a and 11b), the connection assembly 28 may be configured such that the implement 14 and the power unit 12 may rotate vertically (on a horizontal axis) with respect to each other during maneuvering and agricultural operations. As noted previously, in some embodiments, the power unit 12 will be configured to push the implement 14, while in alternative embodiments, the power unit 12 will be configured to pull the implement 14. In some such embodiments, the implement 14 may be at least partially self-supporting on the ground.

Turning to FIGS. 12-15, the connection assembly 28 used to couple the power unit 12 to the implement 14 may include steering mechanisms and power couplings. The steering mechanisms may assist the overall maneuverability of the system 10 (e.g., the combination of the power unit 12 and the implement 14), while the power couplings permit power and communication to be transferred back and forth between the power unit 12 and the implement 14. In more detail, and with reference to FIG. 12, the connection assembly 28 may include a steering mechanism in the form of one or more steering cylinders 40 configured to aid in steering and/or maneuverability of the system 10. For example, the system 10 may include a pair of steering cylinders 40 (one on either side of an articulation point 42 of the connection assembly 28, which may be presented by the vertical pivot of the connection assembly 28) to facilitate steering of the system 10. Such steering cylinders 40 may comprise hydraulic or pneumatic cylinders. A single, two-way cylinder may be used. Alternatively, electrical linear actuators may be used. In view of the above, the connection assembly 28 may comprise an articulated coupling that releasably secures the implement 14 to the power unit 12. Beneficially, the steering cylinders 40 are configured to steer the system 10 (e.g., the power unit 12 and the implement 14) through the articulated coupling by rotating the power unit 12 and the implement 14 with respect to each other about the articulation point 42.

Figure 12:
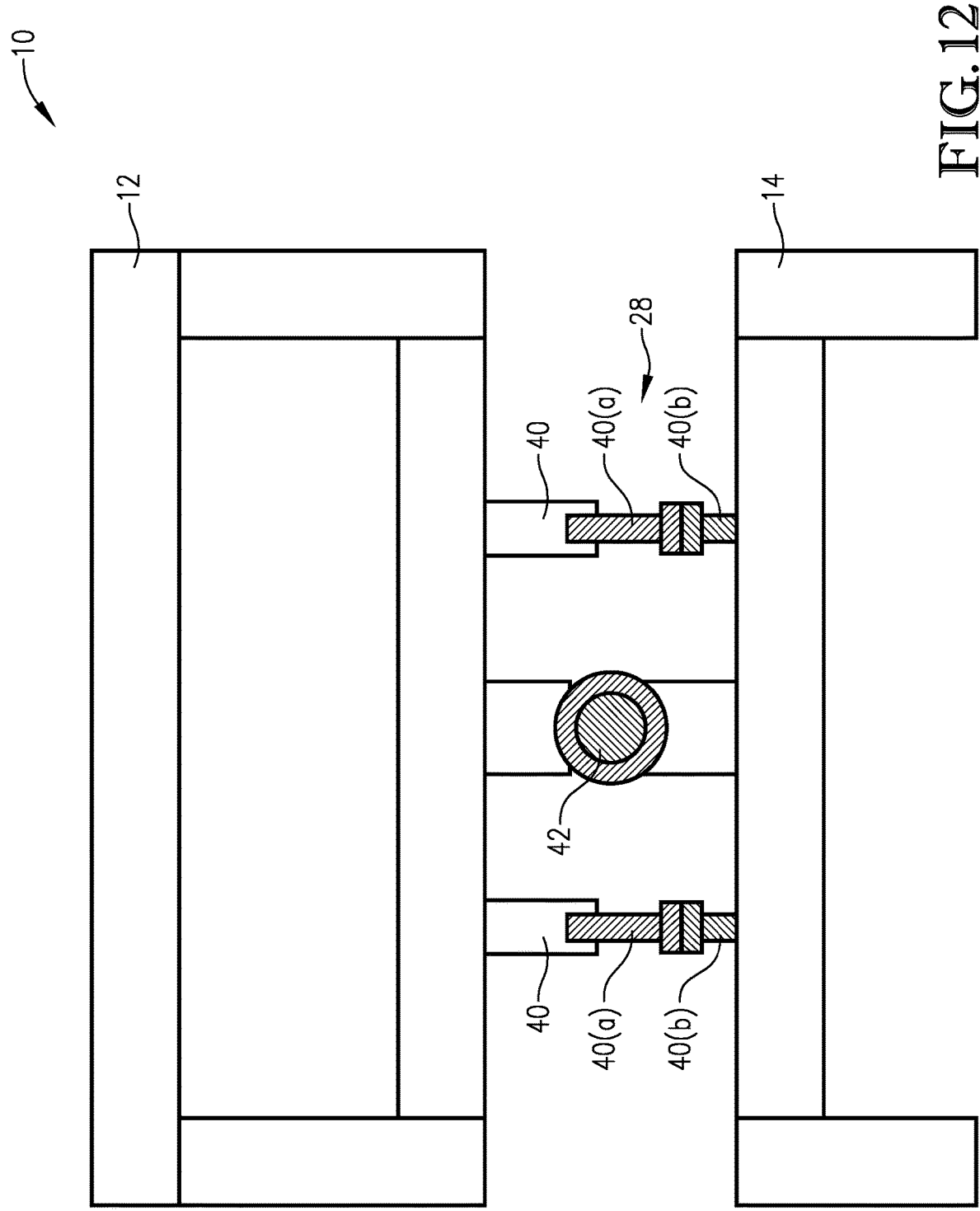
FIG. 12 is a top plan view of an autonomous agricultural system comprising a mobile power unit and an implement coupled with the mobile power unit via a connection assembly, with the connection assembly including steering cylinders for steering the autonomous agricultural system.

For each steering cylinder 40, each of the power unit 12 and the implement 14 may include engageable mating elements that transfer the forces applied by the steering cylinders 40. For example, the steering cylinders 40 may be attached to and extend from power unit 12, as shown in FIG. 12. The power unit 12 may also include a mating element 40(a) that extends from each of the steering cylinders 40, such that the mating elements 40(a) may extend and retract as the steering cylinders 40 extend and retract. Similarly, the implement 14 may include a mating element 40(b) extending from the implement 14 and configured to engage with free ends of the mating elements 40(a) of the power unit 12. In such a configuration, and particularly with a steering cylinder 40 on either side of the articulation point 42, the steering cylinders 40 can be extended and retracted as necessary to assist with maneuvering and turning the system 10. Although FIG. 12 illustrates the steering cylinders 40 being attached to the power unit 12, other embodiments may permit the steering cylinders 40 to be attached to the implement 14.

Figure 13:
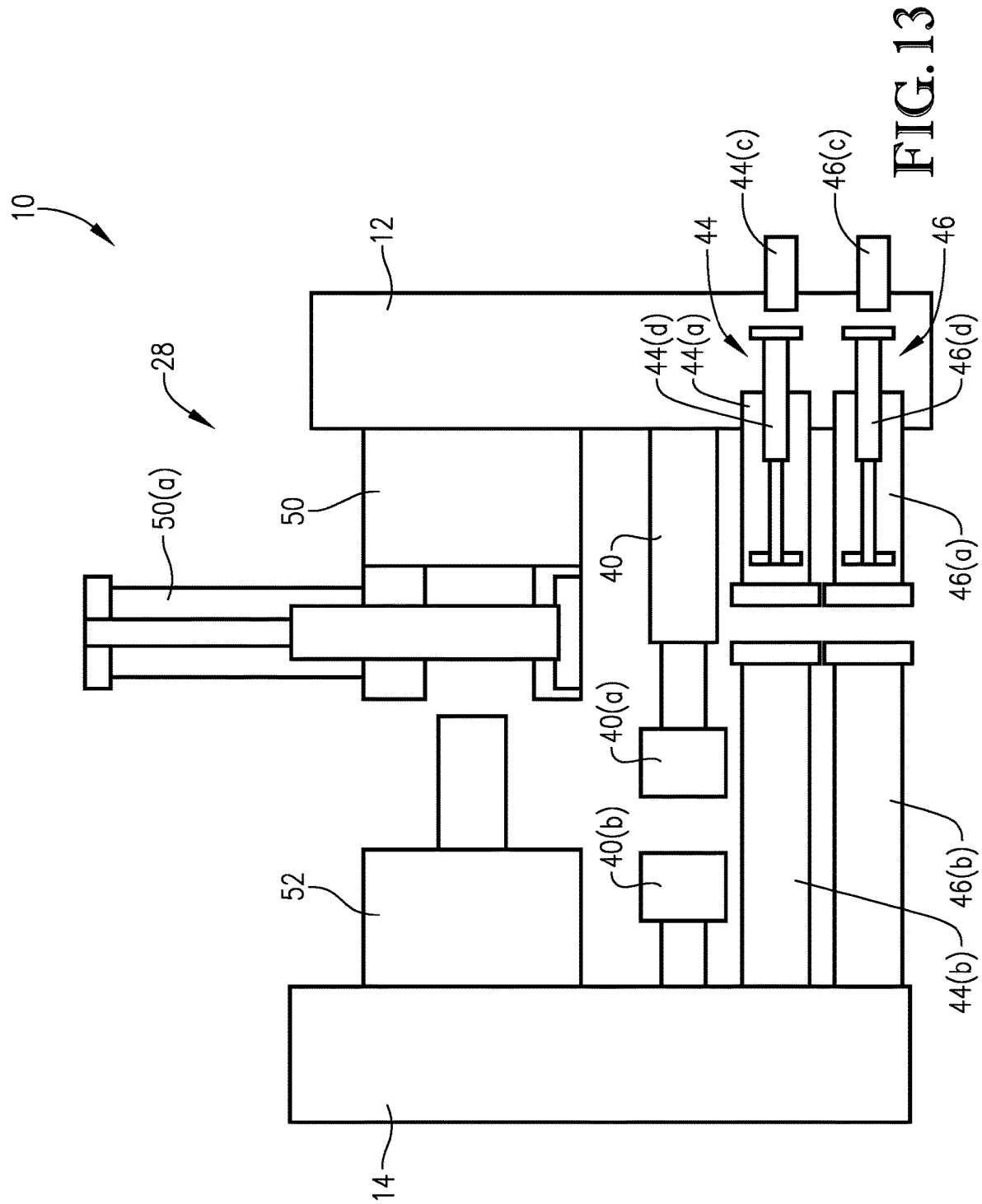
FIG. 13 is a side elevation view of the autonomous agricultural system from FIG. 12, with the connection assembly being in an unconnected configuration, and with the connection assembly further including electric and hydraulic couplers.
Figure 14:
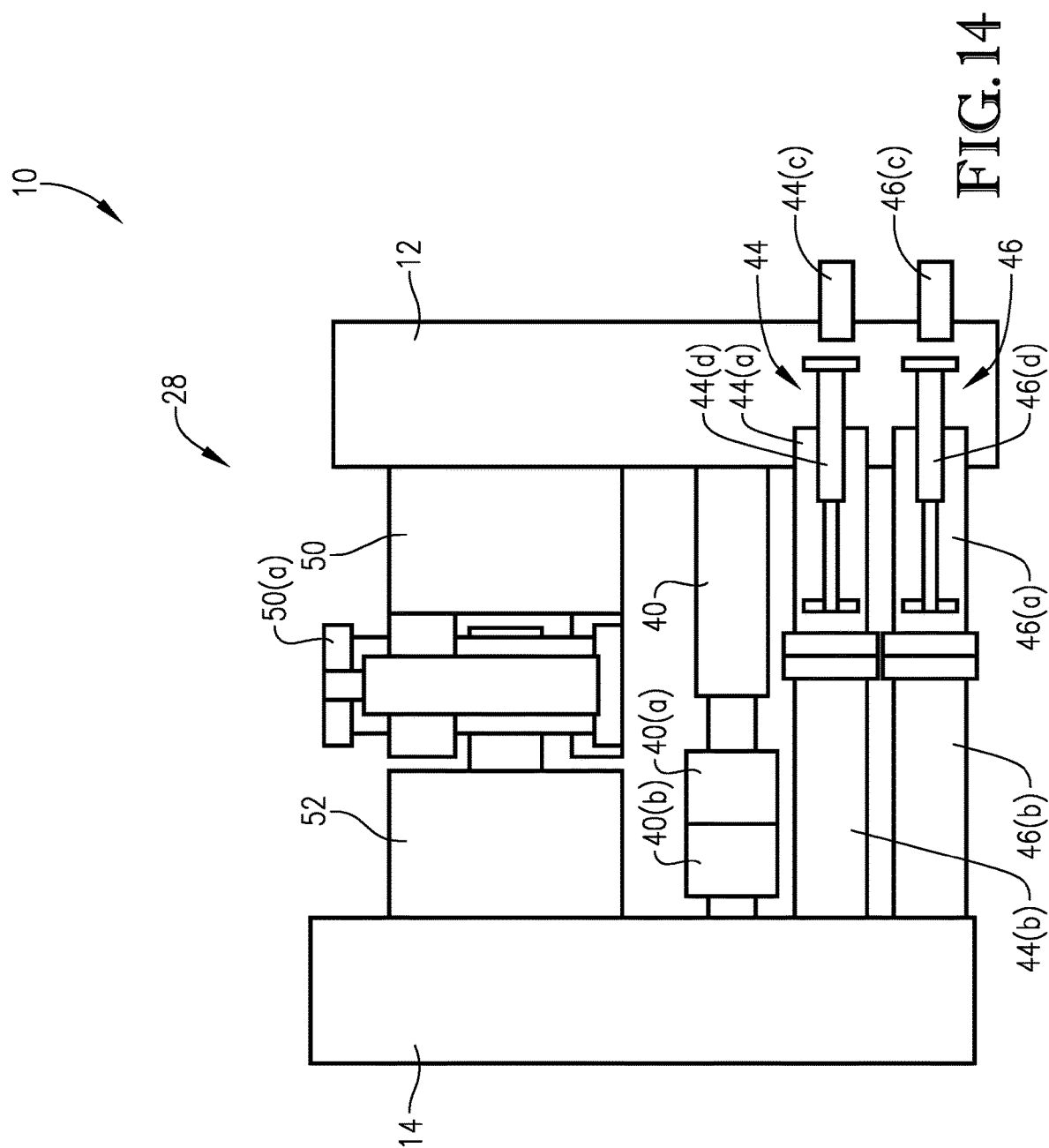
FIG. 14 is a side elevation view of the autonomous agricultural system from FIG. 13, with the connection assembly being in a connected configuration.

Turning to FIGS. 13 and 14, the connection assembly 28 may include one or more coupling mechanisms for transferring power and/or for permitting communication between the power unit 12 and the implement 14. For example, the connection assembly may include an electrical coupler 44 configured to transfer electrical power and/or to allow communication between the power unit 12 and the implement 14. The connection assembly 28 may additionally include a hydraulic coupler 46 configured to transfer hydraulic power between the power unit 12 and the implement 14. Each coupler 44, 46 may include a connection element 44(a), 46(a) associated with the power unit 12 and a connection element 44(b), 46(b) associated with the implement 14. Such connection elements 44(a), 46(a) and 44(b), 46(b) can releasably engage with each other, as shown in FIG. 14, to permit transfer of electrical or hydraulic power. The couplers 44, 46 may be configured to be both rigid and flexible. Specifically, the connection elements 44(a), 46(a), 44(b), 46(b) may be sufficiently rigid to permit coupling from the uncoupled configuration (FIG. 13) to the coupled configuration (FIG. 14). In addition, however, the couplers 44, 46 may be sufficiently flexible to permit relative movement between the power unit 12 and the implement 14 during agricultural operations. For example, as shown in FIG. 14, each of the couplers 44, 46 may be associated with a spring element 44(c), 46(c) configured to create a flexible state for the couplers 44, 46 during agricultural operations. In addition, actuators 44(d), 46(d) may be used to reduce slack in the couplers 44, 46 to create rigidity sufficient to permit accurate alignment for connection between the connection elements 44(a), 46(a), 44(b), 46(b) of the couplers 44, 46. Indexing dowels may also be used to help facilitate alignment between the connection elements 44(a), 46(a),

44(*b*), 46(*b*) of the couplers 44, 46. Once connected, the spring elements 44(*c*), 46(*c*) may be engaged to provide the connection elements 44(*a*), 46(*a*), 44(*b*), 46(*b*) with flexibility during agricultural operations.

In more detail, each of the couplers 44, 46 may include an actuator 44(*d*), 46(*d*) to facilitate connection between the connection elements 44(*a*), 46(*a*), 44(*b*), 46(*b*) of the couplers 44, 46. The actuators 44(*d*), 46(*d*) may comprise hydraulic cylinders, pneumatic cylinders, electric linear actuators, or the like. Such actuators 44(*d*), 46(*d*) may be used to extend or retract the connection elements 44(*a*), 46(*a*) of the power unit 12 to permit accurate connection with the connection elements 44(*b*), 46(*b*) of the implement 14. Although the actuators 44(*d*), 46(*d*) are shown being associated with the connection elements 44(*a*), 46(*a*) of the power unit 12, in other embodiments, the actuators 44(*d*), 46(*d*) may be associated with the connection elements 44(*b*), 46(*b*) of the implement 14. As shown, the actuators 44(*d*), 46(*d*) may permit longitudinal shifting of the connection elements 44(*a*), 46(*a*); however, in other embodiments, the actuators 44(*d*), 46(*d*) may also permit lateral or vertical shifting of the connection elements 44(*a*), 46(*a*) In some embodiments, once the couplers 44, 46 have been engaged, the actuators 44(*d*), 46(*d*) may be relaxed to permit the spring elements 44(*c*), 46(*d*) to function to provide flexibility to the couplers 44, 46. In certain embodiments, the connection elements 44(*a*), 46(*a*), 44(*b*), 46(*b*) of the couplers 44, 46 may be locked together via various methods of securement, such as mechanisms similar to those used between spark plugs and wires or flat-face hydraulics.

Remaining with FIGS. 13 and 14, the connection assembly 28 may include a mechanical linkage that releasably connects the power unit 12 to the implement 14 in a manner to permit the power unit 12 to transport the implement 14. For instance, the connection assembly 28 may include a power unit connection 50 associated with the power unit 12 that is configured to couple with an implement connection 50 associated with the implement 14. The power unit connection 50 may include a locking element 50(*a*) configured to selectively lock the power unit connection 50 to the implement connection 52 once the implement connection 52 is aligned with and/or engaged with the power unit connection 50. The locking element 50(*a*) may comprise an actuator, such as a hydraulic cylinder, a pneumatic cylinder, an electric linear actuator, or the like. Although the figures illustrate the locking element 50(*a*) being associated with the power unit connection 50, other embodiments may provide for the locking element 50(*a*) to be associated with the implement connection 52. In some embodiments, either or both of the power unit connection 50 and/or the implement connection 52 may be vertically shifted, laterally shifted, and/or longitudinally shifted so as to aid in alignment and coupling of the power unit connection 50 and/or the implement connection 52.

In some embodiments, the connection assembly 28 may comprise a two-stage hitching assembly to facilitate ease of alignment between the power unit 12 and the implement 14. For example, the two-stage hitching assembly may include the steering actuators 40, the actuators 44(*d*), 46(*d*) associated with the couplers 44, 46, and/or the adjustable power unit connection 50 and/or the implement connection 52, each of which may be configured to have their positions shifted (e.g., vertically, laterally, and/or longitudinally). A such, the power unit 12 can maneuver adjacent to the implement 14 for connection but may not be at exactly the correct position and orientation with the implement 14 for proper connection. Nevertheless, the two-stage hitch may be configured to extend towards the implement 14 and be able to shift in multiple directions until the power unit 12 and implement 14 are linked at a first coupling. The first, initial coupling may be sufficient to pull (or otherwise shift the position of) the implement 14 into a proper alignment with the power unit 12 which will complete the alignment to the power unit 12. Once the power unit 12 and implement 14 are fully aligned a second, final coupling may be completed (e.g., via actuator of the locking element 50(*a*)), such that the power unit 12 and implement 14 are locked together in the proper position and orientation. Such embodiments may be beneficial when hitching on uneven soil, or if the implement 14 has settled into soft ground or mud after being previously unhooked. Broadly, the two-stage hitching assembly would permit the power unit 12 to properly align with any random implement 14 parking condition.

Figure 15:
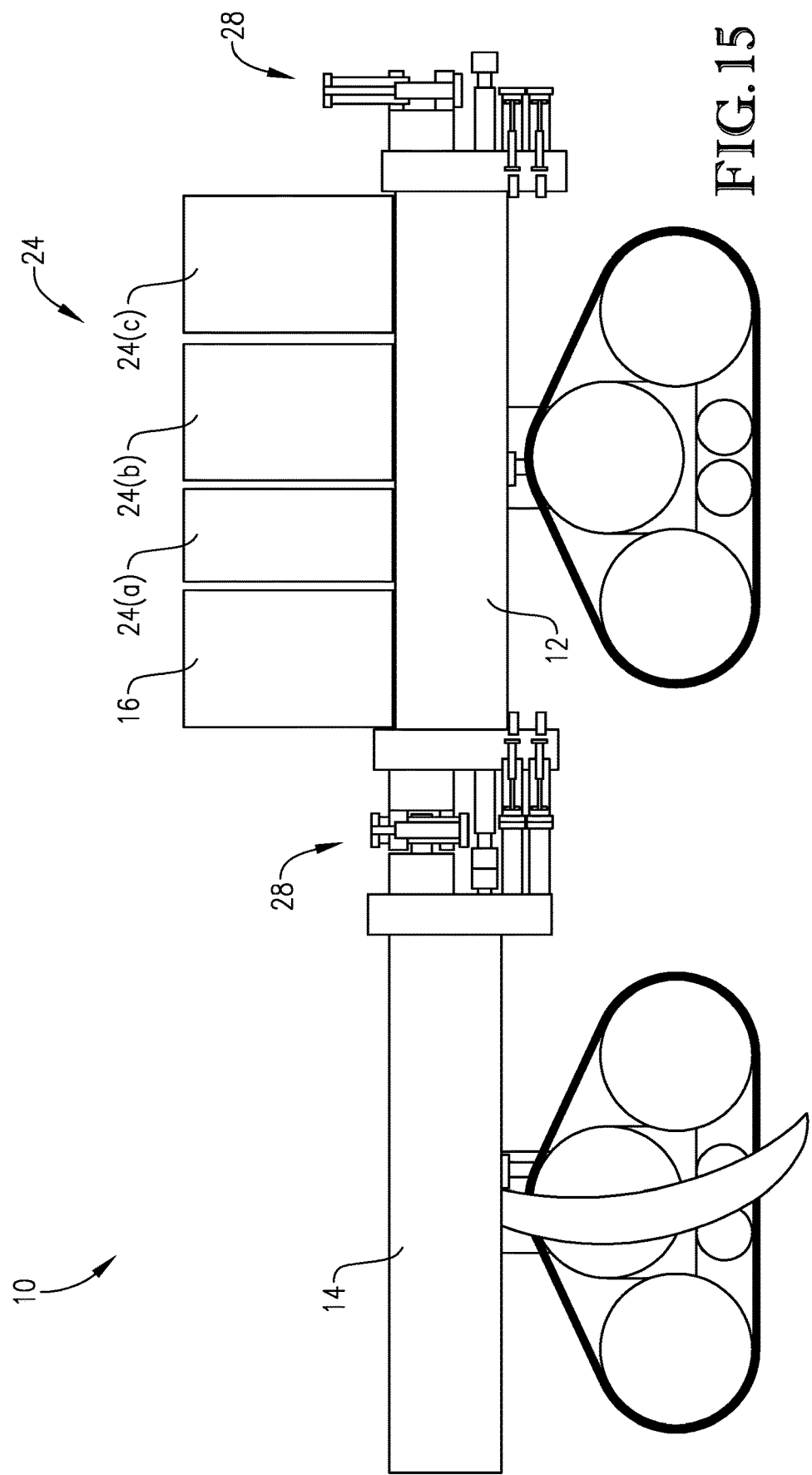
FIG. 15 is another side elevation view of an autonomous agricultural system comprising a mobile power unit and an implement coupled with the mobile power unit via the connection assembly shown in FIGS. 13 and 14.

FIG. 15 illustrates an embodiment of a system 10 comprising a power unit 12 being operably engaged with an implement 14 via a connection assembly 28. As illustrated, the connection assembly is positioned at a back side of the power unit 12, such that the implement 14 is connected to the back side of the power unit 12. As a result, the power unit 12 can propel the implement 14 (e.g., pushing or pulling) to perform agricultural operations. The steering actuators 40 of the connection assembly 28 also facilitates maneuvering of the system In some embodiments, the power unit 12 can also provide power to the implement 14, such as via the power supply 24 providing electrical, mechanical, combustive, hydraulic, or pneumatic power via the connection assembly 28. As shown in FIG. 15, for instance, the power unit 12 may include a hydraulic pump 24(*a*) from which hydraulic power (e.g., via pressurized hydraulic fluid) can be provided to the implement 14, an electric generator 24(*b*) or battery from which electric power can be provided to the implement 14, and a combustion engine 24(*c*) from which mechanical/rotary power can be provided to the implement 14. As noted previously, each of the hydraulic pump 24(*a*), the electric generator/battery 24(*b*), and the combustion engine 24(*c*) can independently shift positions on the power unit 12 to shift weight as may be necessary. The power unit 12 may also include a control system 16 (e.g., memory, processors, communication elements, and computer programs) for controlling operations and communications of the power unit 12 and/or the implement 14. Such a control system 16 may also have its position shifted with respect to the power unit 12, if necessary. As shown in FIG. 15, in some embodiments, a front end of the power unit 12 may also include a connection assembly 28 to which a second implement (not shown) may be connected, such that the power unit 12 can simultaneously propel and/or power multiple implements 14 for performing agricultural operations.

In some further embodiments, each of the power unit 12 and the implement 14 may include a suspension system that permits the power unit 12 and/or the implement 14 to raise and lower (vertically shift) their respective frames with respect to the ground. The suspension systems may also be used to maximizing operational efficiencies of the system 10 by properly adjusting weight distribution, traction, and/or floatation of the power unit 12 and the implement 14. The suspension system of each of the power unit 12 and the implement 14 may be pneumatic or hydraulic. In some embodiments, the suspension system of the power unit 12 and the implement 14 may be linked together, such that they can operate in unison to further enhance efficiency of the system 10. Communication between the suspension systems may be accomplished via the connection assembly 28 or wirelessly. In further embodiments, each of the power unit 12 and the implement 14 may include a brake system that permits the power unit 12 and/or the implement 14 perform braking operations during agricultural operations. The brake system of each of the power unit 12 and the implement 14 may be pneumatic or hydraulic. In some embodiments, the brake system of the power unit 12 and the implement 14 may be linked together, such that they can operate in unison to further enhance efficiency of the system 10. Communication between the brake systems may be accomplished via the connection assembly 28 or wirelessly.

Although the invention has been described with reference to the one or more embodiments illustrated in the figures, it is understood that equivalents may be employed and substitutions made herein without departing from the scope of the invention as recited in the claims.

Having thus described one or more embodiments of the invention, what is claimed as new and desired to be protected by Letters Patent includes the following:

The invention claimed is:

1. An autonomous agricultural system comprising:
    a mobile power unit including a frame, a drive mechanism, and a power supply, wherein said mobile power unit further includes a load sensor associated with the drive mechanism of said mobile power unit and configured to measure loads imparted by said mobile power unit,
    wherein a position of said power supply is shiftable in at least two dimensions with respect to said frame of said mobile power unit;
    an implement releasably secured to said mobile power unit, wherein said implement includes a drive mechanism, and wherein said implement further includes a load sensor associated with the drive mechanism of said implement and configured to measure loads imparted by said implement,
    wherein said mobile power unit is configured to transport said implement, and wherein said mobile power unit is further configured to provide power from said power supply to said implement; and
    a control system configured as a monitoring system to monitor loads, via the load sensors, at each of the drive mechanisms of said mobile power unit and said implement and to adjust a position of the power supply based on the monitored loads to optimize traction or soil compaction of said autonomous agricultural system.

2. The autonomous agricultural system of claim 1, wherein said mobile power unit is autonomously controlled based on a location-determining element associated with said mobile power unit.

3. The autonomous agricultural system of claim 2, wherein said location-determining element comprises a global-positioning system (GPS).

4. The autonomous agricultural system of claim 1, wherein said implement is an agricultural implement configured to modify the ground soil.

5. The autonomous agricultural system of claim 4, wherein said implement comprises a tiller.

6. The autonomous agricultural system of claim 5, wherein said tiller includes one or more rotary components, and wherein actuation of said rotary components provide tractive effort for the tiller.

7. The autonomous agricultural system of claim 1, wherein said implement is an agricultural implement configured to apply material into or onto the ground soil.

8. The autonomous agricultural system of claim 7, wherein the implement is a seeder configured to deposit seed into or onto the ground soil.

9. The autonomous agricultural system of claim 1, wherein said implement is an agricultural implement configured to harvest crop from the ground soil.

10. The autonomous agricultural system of claim 1, wherein said mobile power unit is configured to support at least a portion of a weight of said implement.

11. The autonomous agricultural system of claim 1, wherein the drive mechanism of said mobile power unit includes one or more tracks.

12. The autonomous agricultural system of claim 11, wherein the drive mechanism of said implement includes one or more tracks.

13. The autonomous agricultural system of claim 12, further comprising a track removal component configured to follow behind said mobile power unit to modify the ground soil to remove tracks created by the drive mechanisms of said mobile power unit or said implement.

14. The autonomous agricultural system of claim 1, wherein said power supply comprises an electric generator or one or more batteries.

15. The autonomous agricultural system of claim 14, wherein said mobile power unit is configured to provide electrical power from said power supply to said implement.

16. The autonomous agricultural system of claim 1, wherein said mobile power unit is configured to provide hydraulic power from said power supply to said implement.

17. The autonomous agricultural system of claim 1, wherein said implement is releasably secured to said mobile power unit via a connection assembly, and wherein a position of said connection assembly is configured to be vertically shifted.

18. The autonomous agricultural system of claim 1, wherein said implement is releasably secured to said mobile power unit via a connection assembly, and wherein said connection assembly comprises a vertical pivot presenting an articulate coupling.

19. The autonomous agricultural system of claim 18, wherein said connection assembly comprises a steering mechanism configured to steer said autonomous agricultural system.

20. The autonomous agricultural system of claim 19, wherein said steering system comprises one or more steering cylinders, wherein said connection assembly additionally comprises an electric coupler configured to transfer electric power between said mobile power unit and said implement and a hydraulic coupler configured to transfer hydraulic power between said mobile power unit and said implement.

21. The autonomous agricultural system of claim 18, wherein said implement is releasably secured to said mobile power unit via an automated coupling process.

* * * * *